May 26, 1970  E. W. SPRINGER  3,513,708

ALTITUDE INDICATING AND REPORTING SYSTEM

Filed June 24, 1968  12 Sheets-Sheet 1

INVENTOR
EARL W. SPRINGER
BY
Hood, Gust, Irish & Lundy
ATTORNEYS

May 26, 1970     E. W. SPRINGER     3,513,708

ALTITUDE INDICATING AND REPORTING SYSTEM

Filed June 24, 1968

INVENTOR
EARL W. SPRINGER
BY
Hood, Gust, Irish & Lundy
ATTORNEYS

INVENTOR
EARL W. SPRINGER
BY
Hood, Gust, Irish & Lundy
ATTORNEYS

May 26, 1970     E. W. SPRINGER     3,513,708
ALTITUDE INDICATING AND REPORTING SYSTEM
Filed June 24, 1968     12 Sheets-Sheet 7

INVENTOR
EARL W. SPRINGER
BY
*Hood, Gust, Irish & Lunn*
ATTORNEYS

May 26, 1970  E. W. SPRINGER  3,513,708
ALTITUDE INDICATING AND REPORTING SYSTEM
Filed June 24, 1968  12 Sheets-Sheet 8
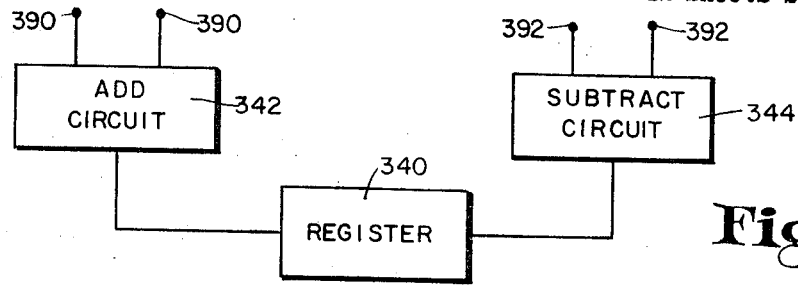
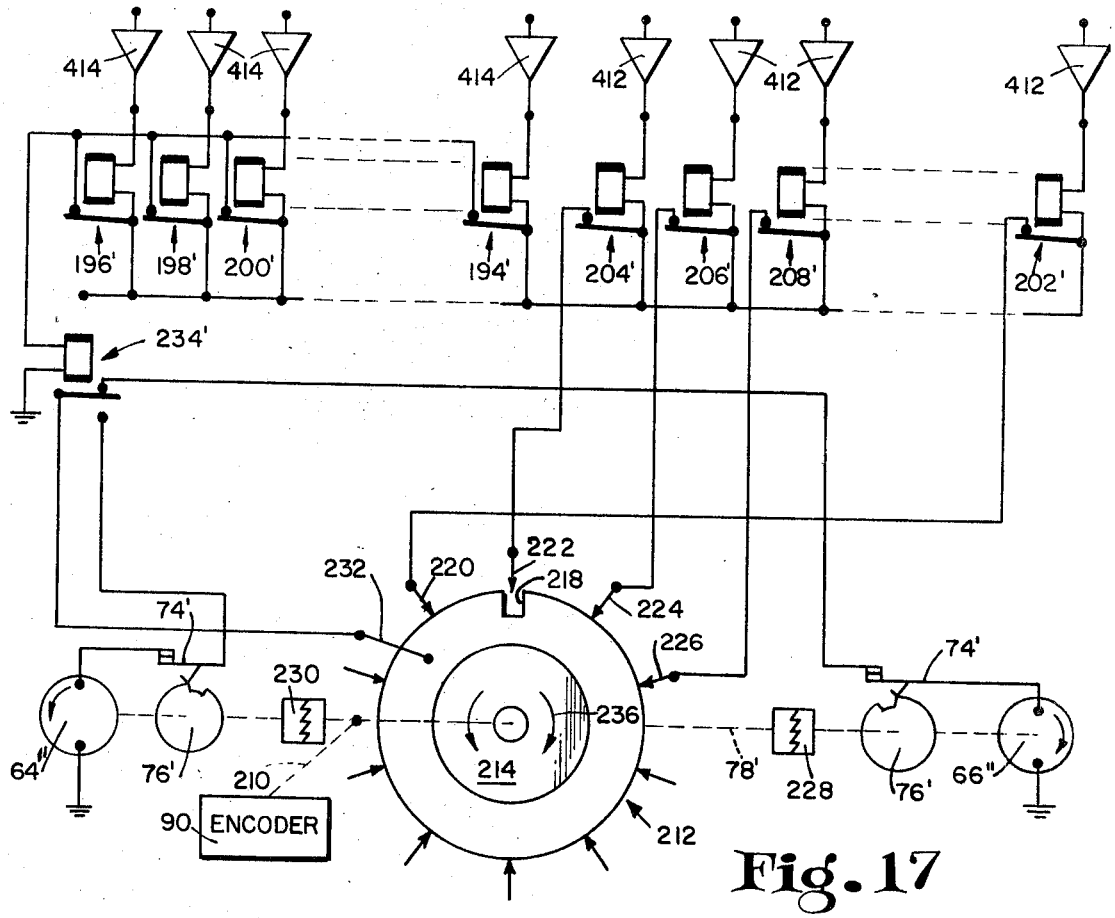
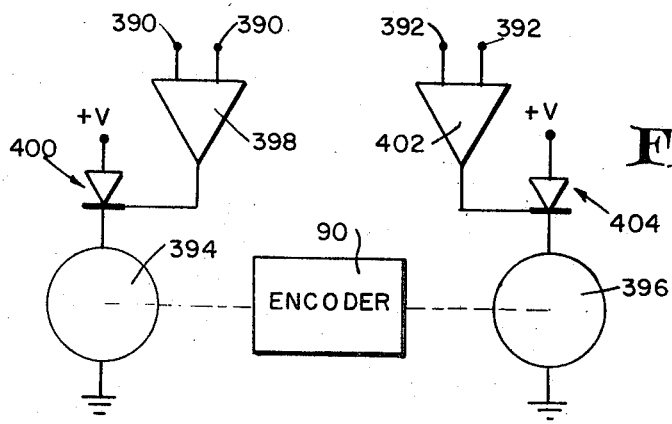
INVENTOR
EARL W. SPRINGER
BY
Hood, Gust, Irish & Lundy
ATTORNEYS May 26, 1970 E. W. SPRINGER 3,513,708
ALTITUDE INDICATING AND REPORTING SYSTEM
Filed June 24, 1968 12 Sheets-Sheet 9

INVENTOR
EARL W. SPRINGER
BY
Hood, Gust, Irish & Lundy
ATTORNEYS

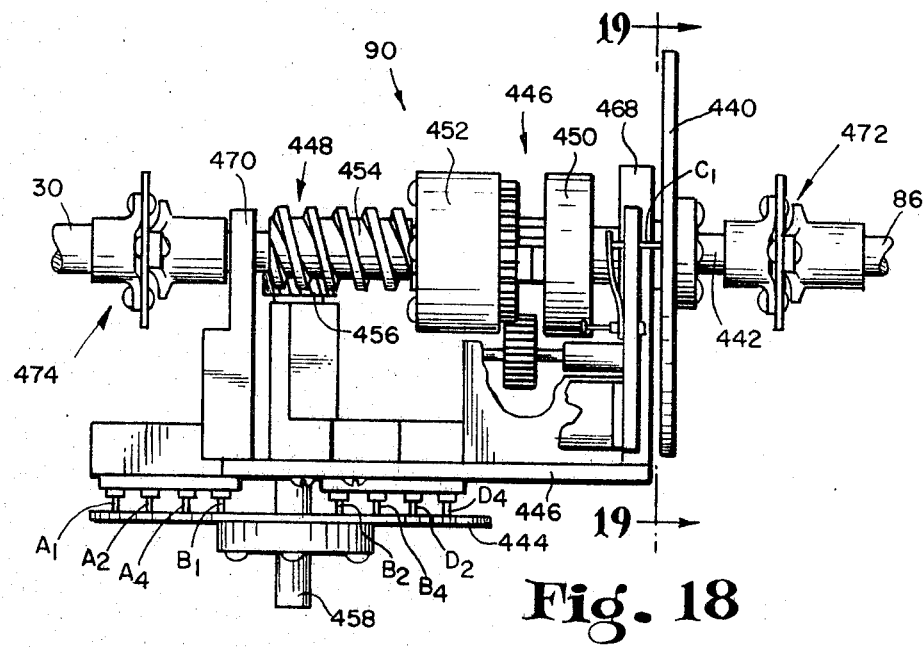
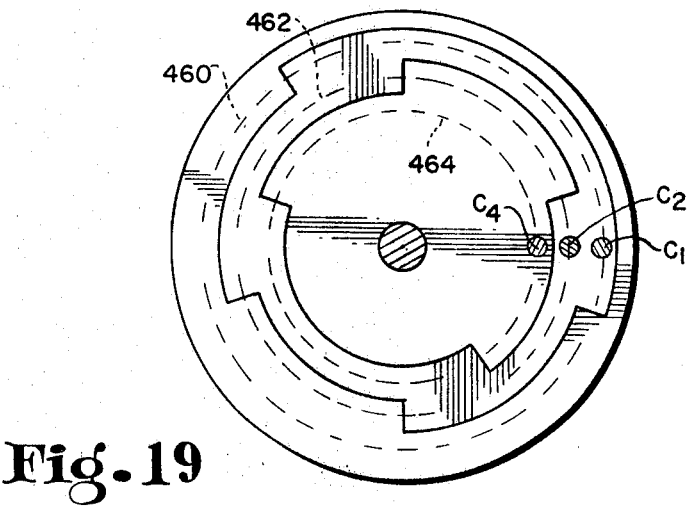
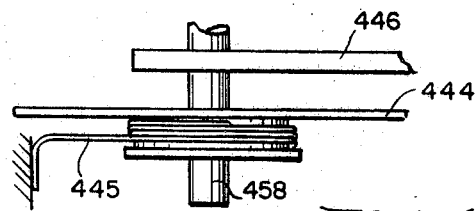

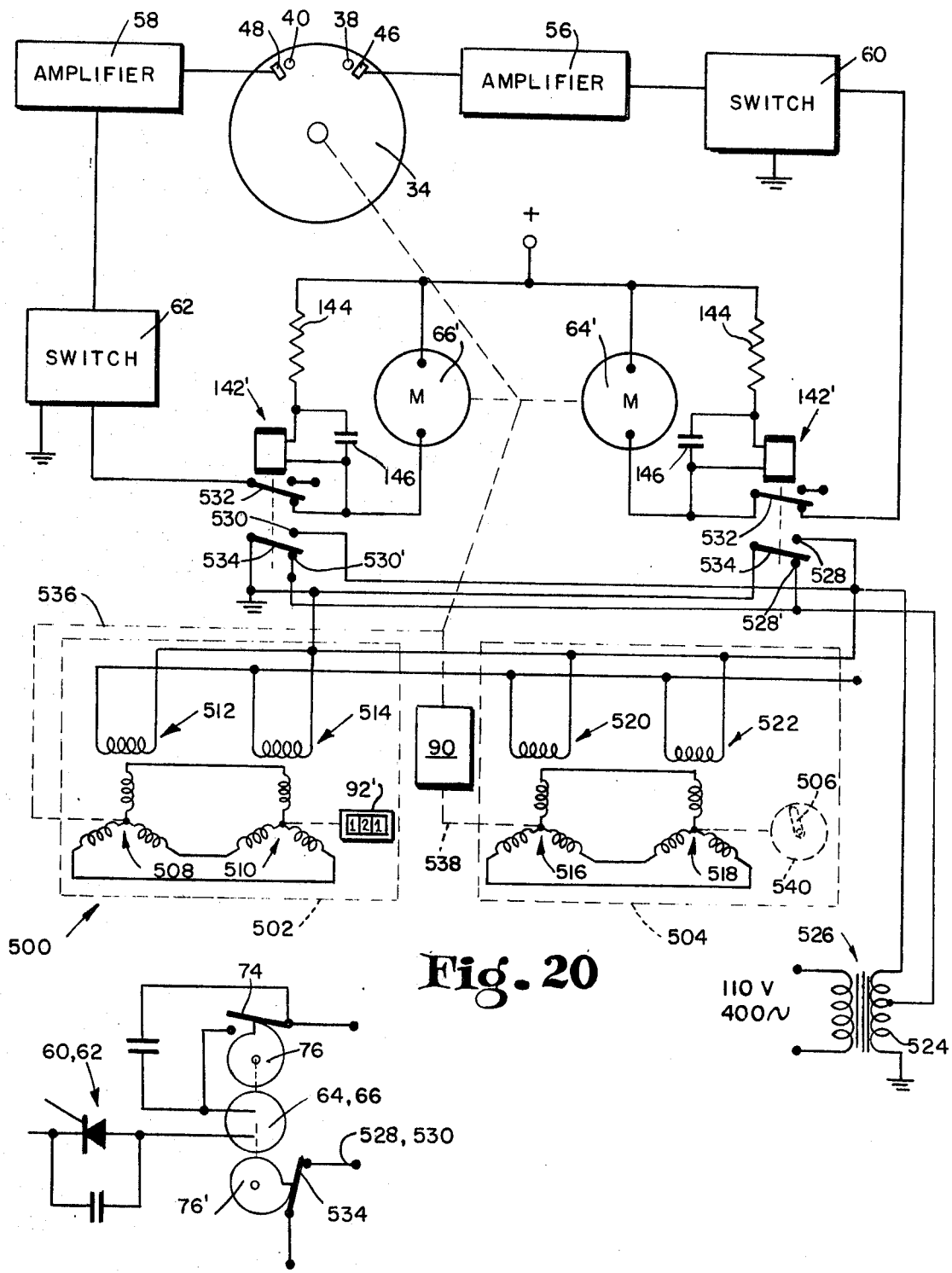

United States Patent Office 3,513,708
Patented May 26, 1970

3,513,708
ALTITUDE INDICATING AND
REPORTING SYSTEM
Earl W. Springer, Box 220, Fairland, Ind. 46126
Filed June 24, 1968, Ser. No. 739,406
Int. Cl. G01l 7/00
U.S. Cl. 73—384                           34 Claims

ABSTRACT OF THE DISCLOSURE

An aircraft altitude indicating and reporting system comprising an altimeter, electro-optical means for tracking the position of the indicator of the altimeter, first means including a register for registering the position of the indicator and providing an output corresponding to such a position, and second means for operatively connecting the first means to the electro-optical tracking means. This second means is effective, when the indicator moves in one direction, to operate the register to add increments of such movement and, when the indicator moves in the opposite direction, to operate the register to subtract like increments of movement. The tracking means is arranged so that it will, in no way, interfere with the free movement of the indicator of the altimeter. The system of the present invention, therefore, comprises a standard aircraft altimeter and means for reading the altimeter, which reading means is arranged so that it will, in no way, disturb or change the characteristics of the altimeter.

---

It is an object of my invention to provide an altitude indicating and reporting system which is extremely reliable and simple in construction, but yet which is satisfactory for the purpose intended. My system is arranged to take readings directly from a conventional aircraft altimeter in which pilots have great confidence and to present these readings in a form in which they can be transmitted via a conventional transponder to a ground station. In addition, for checking purposes, my system may include a visual numerical display device for reporting the readings, to the nearest 100 feet, being fed to the transponder for transmission, this device being adapted to be placed adjacent the regular altimeter mounted in the instrument panel of a plane so that its pilot can easily determine whether or not the equipment is reporting the correct altitude. Of course, such a display device will then give the pilot a reading from two altimeters, i.e., his primary altimeter mounted in the instrument panel and the altimeter comprising my system. My system may also include still another display device for providing the pilot, at a glance, a reading, to the nearest 500 feet, of the altitude being reported.

Many years of research and development and testing have produced the standard aircraft altimeter which utilizes the forces developed by barometric pressure changes to drive indicators or pointers. Of course, these forces are very small and, consequently, the altimeter is a very delicate instrument. Heretofore, to my knowledge, no one has been able successfully to use the forces developed by the pressure sensing means of an altimeter to drive electrical pick-off devices such as variable resistors. The problem is that any such pick-off device will present such a load to the pressure sensing means that the output of the pressure sensing means will be erratic. It is for these reasons that my system is arranged to take readings from a standard altimeter without, in any way, placing a load on the pressure sensing means of the altimeter. In fact, in the preferred embodiments of my system, a standard altimeter, which is the only instrument technically and legally that can be used for air navigation, can be purchased and installed therein without, in any way, being modified. That is, my preferred system includes means for tracking the movement of the altimeter indicator through the glass cover plate of the altimeter.

My system may be used in conjunction with a transponder carried on an airplane and arranged to transmit the identity of the plane as well as other information, such as the altitude at which the plane is flying. With the advent of radar control of air traffic, a world wide system utilizing pulse communication from such transponders is being placed in service. The success of this world wide system will depend, for the most part, on the capability of most, if not all, of the flying aircraft to transmit via a transponder the necessary information, including altitude. My system is so simple in construction that it will be economically feasible for small aircraft owners to purchase and install the system in their aircraft. It will be understood, however, that my system can be provided in forms which are sufficiently sophisticated to be used in very large and expensive and complicated aircraft systems. My system, in one or more embodiments, is ideally suited for use with the air data computer systems presently being proposed for use with large commercial aircraft.

My altitude indicating and reporting system will provide an output which is in the form of a digital code suitable for automatic altitude transmission via the authorized air traffic control radar beacon system. This code is published in Report No. 8893–SP–1, for Federal Aviation Authority Contract FAA/BRD–329, Task No. 6. Further, my code complies with International Civil Aviation Organization (ICAO) international agreements. One preferred embodiment of my system, therefore, comprises an encoder which is driven to produce this digital code output which is suitable for transmission via a transponder to a ground station. It will be understood, however, that my system is not limited to the use of such an encoder to produce the desired digital code. For instance, I may use a plurality of electronic circuits forming a register, which circuits are arranged to energize and deenergize switch means, each of which produces one bit of the code.

While I have described herein an altitude indicating and reporting system, it will be appreciated that the concepts embodied in my system may be used to read and report the output of any sensing means without, in any way, affecting the characteristics of the sensing means. Specifically, my system will track any movable indicator and provide a pulse output representing the position of the indicator. For instance, my system may be used in conjunction with any meter of the type having a movable pointer to read and report, by a series of pulses, the position of the pointer.

The above-mentioned ICAO agreements specify that the aircraft shall report its altitude in increments of 100 feet. It is necessary, therefore, to sense the position of the indicator of an altimeter at ten equally peripherally spaced positions about the face of the altimeter. That is, in a standard altimeter, movement of the indicator 36° represents a change in altitude of 100 feet. One of my preferred embodiments is arranged to provide a different series of pulses as an output for each 100 foot increment of altitude. Another of my preferred embodiments is arranged continually to track the indicator of the altimeter and to report, if desired, any change of altitude which would probably by noticed by a pilot watching his primary altimeter. This last embodiment is, of course, more sophisticated than required to meet the standards established by ICAO.

One preferred embodiment of my system utilizes an encoder to provide the various pulse group series outputs representing 100 foot increments of altitude, the encoder including at least one disc having a plurality of concentrically arcuate contact strips formed thereon, a contact member arranged to engage each of the contact strips and means mounting the disc and the contact members for relative rotation. I prefer to use a pair of rotary stepping motors for producing such relative rotation, one motor being arranged to produce a predetermined amount of relative rotation in one direction for each 100 foot increase in altitude and the other motor being arranged to produce a like amount of relative rotation in the opposite direction for each 100 foot decreases in altitude. Thus, my encoder is driven in steps representing 100 foot increments in altitude. Since my encoder is driven in finite steps by such stepping motors, there will be no tendency for it to drift between the levels of altitude at which it is desired that an altitude report be made. That is, my encoder will produce a particular pulse group series steadily until it is stepped in one direction or the other to produce a different pulse group series. I prefer to use rotary stepping motors which produce relatively high output torques so that I can urge each contact member of the encoder against its associated contact srtip with greater force which will, in effect, be a load which must be overcome by the stepping motors. However, this greater force of engagement between each contact member and contact strip provides a more reliable contact therebetween.

I prefer to use the same rotary stepping motors which drive the encoder to drive my abovementioned visual numerical display device. Thus, since the encoder is driven in a step-by-step manner representing 100 foot increments of altitude, the display device is likewise driven in a step-by-step manner to change from one reading to the next in a fraction of a second.

The above-mentioned Report No. 8893–SP–1 suggests that the means for producing pulse group series representing altitude be disposed in a container which is 3½" by 12½" by 7⅝". I have constructed one embodiment of my system in such a container. It will be understood, however, that the various sub-assemblies comprising my system can be separated and located at different and remote locations in an aircraft without degrading the operational performance thereof.

SUMMARY OF THE INVENTION

My invention is, therefore, an apparatus comprising sensing means including a movable indicator, means for tracking the position of the indicator, the tracking means including electro-optical means for detecting movement of the indicator, first means including a register for registering the position of the indicator and providing an output corresponding to such a position, and second means for operatively connecting the first means to the electro-optical means. This second means is effective, when the indicator moves in one direction along its path of movement, to operate the register to add increments of such movement and, when the indicator moves in the opposite direction along its path, to operate the register to subtract like increments of movement.

It is an object of my invention to provide such an apparatus in which the electro-optical means includes a plurality of light-responsive devices spaced along the path of movement of the indicator, a light source associated with said devices, each of said devices being effective, when the indicator moves adjacent thereto and produces a change in the amount of light impinging thereon, electrically to change state to indicate such movement of the indicator.

Another object of my invention is to provide such an apparatus in which the devices are spaced in pairs along the path of movement, one device of each pair providing an output effective, when applied by the second means to the first means, to operate the register to add an increment of movement and the other device of each pair providing an output effective, when applied by the second means to the first means, to operate the register to subtract such an increment of movement.

Still another object of my invention is to provide such an apparatus in which the second means includes an adding means and a subtracting means operatively connected to the register, whereby, when the indicator is approximately centered relative to the said one and the said other device of a pair, the adding means and subtracting means are simultaneously operated, each to cancel the effect of the other, and, when the indicator moves away from such a centered position, the register is operated to register the direction of movement of the indicator.

A further object of my invention is to provide such an apparatus in which the register comprises an encoder and shaft means drivingly connected to the encoder, the adding means including first means for driving the encoder shaft means in one direction and the subtracting means including second means for driving the encoder shaft means in the opposite direction. As stated previously, I prefer that these driving means be rotary stepping motors which are capable of moving the shaft means in finite steps.

Still a further object of my invention is to provide such an apparatus in which the second means includes a rotary switch means of the open-circuit seeking type providing a directional sense for the system which drives the encoder.

Yet another object of my invention is to provide such an apparatus in which the indicator is mounted for movement about an axis, and the electro-optical means includes a pair of light-responsive devices, mounted on a support means which is journalled for rotation about the axis and adjacent the indicator. Light source means is carried by the support means and arranged to direct light toward the path of movement of the indicator, the indicator being proportioned and designed to reflect light toward the devices, and each of the devices being effective, when the indicator moves adjacent thereto and produces a change in the amount of light impinging thereon, electrically to change state. The second means includes drive means responsive to such a change in state of the devices and drivingly connected to the support means, the drive means being arranged to drive the support means to maintain the devices respectively on opposite sides of the indicator. This drive means is arranged so that, when one of the devices changes state, it drives the support means in one direction about the axis and, when the other of the devices changes state, it drives the support means in the opposite direction about the axis.

Another object of my invention is to provide such an apparatus including an encoder which is driven by the same drive means which drives the support means upon which the light-responsive devices are carried.

Still another object of my invention is to provide such an apparatus in which the second means includes first pulse means operatively connected to the drive means for the support means and arranged to provide an electrical pulse each time the support means is driven a predetermined amount in one direction about its axis and second pulse means operatively connected to the drive means and arranged to provide an electrical pulse each time the support means is driven a similar amount in the opposite direction about its axis.

A further object of my invention is to provide such an apparatus including a register comprising means for adding pulses provided by the first pulse means and subtracting pulses provided by the second pulse means.

Other objects and features of the present invention will become apparent as this description progresses.

To the accomplishment of the above and related objects, my invention may be embodied in the forms illustrated in the accompanying drawings, attention being called to the fact-however, that the drawings are illustrative only, and that change may be made in the specific constructions illustrated and described, so long as the scope of the appended claims is not violated.

In the drawings:

FIG. 13 is a block diagram showing an electronic register for adding and subtracting the pulses produced by the pulse means of FIG. 12;

FIG. 14 is a block diagram of an encoder system for adding and subtracting the pulses produced by the pulse means of FIG. 12;

Figure 15:
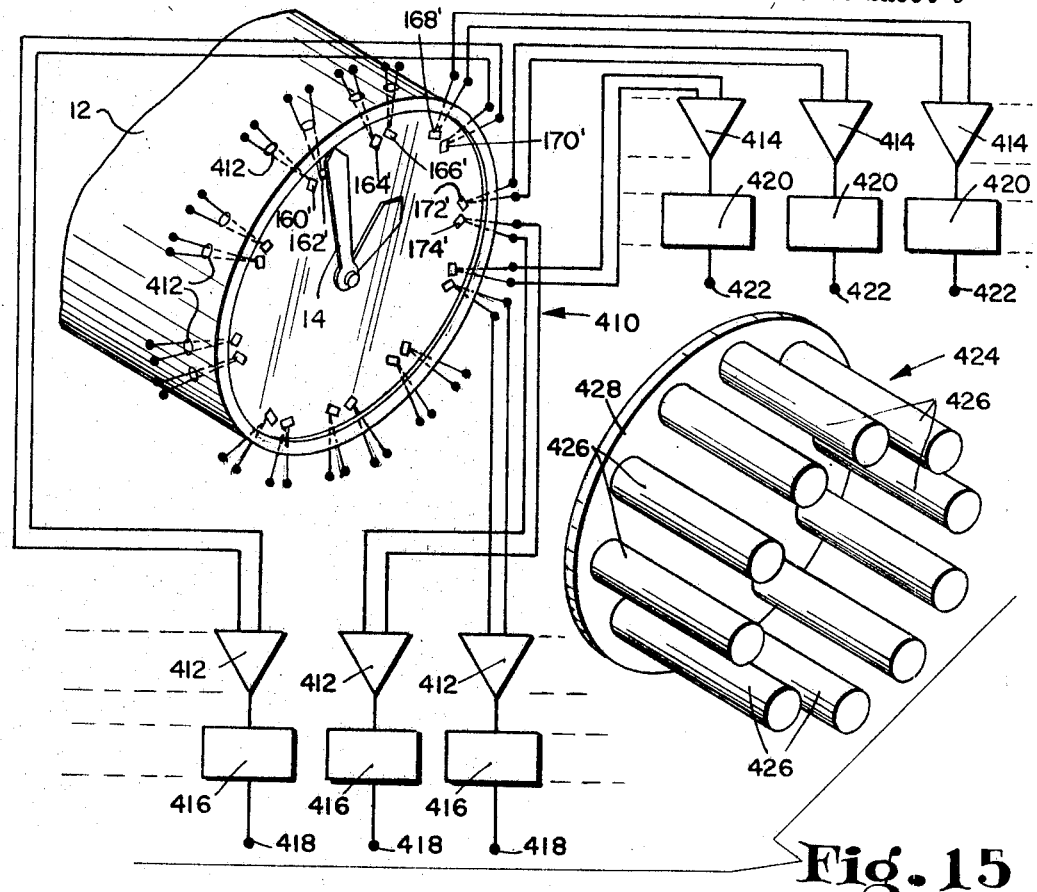
Figure 16:
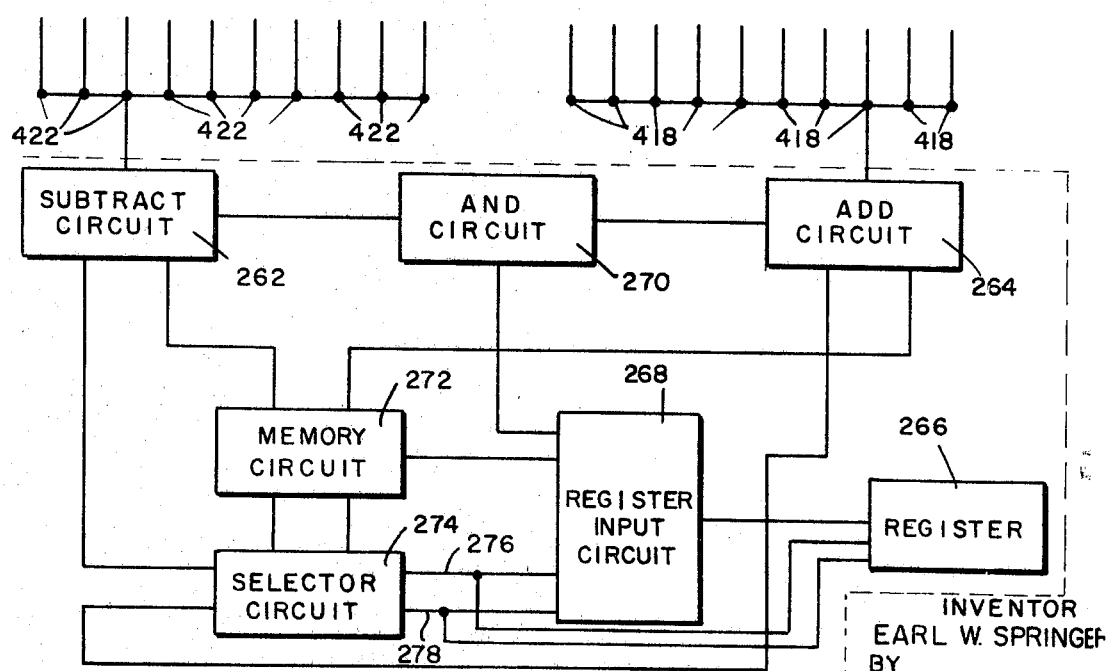
Figure 22:
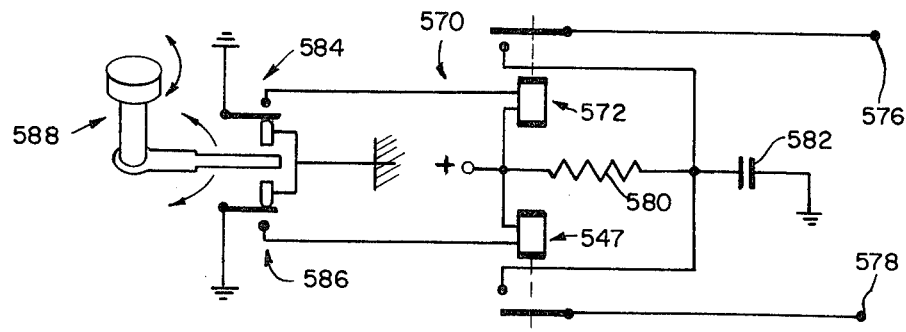
Figure 23:
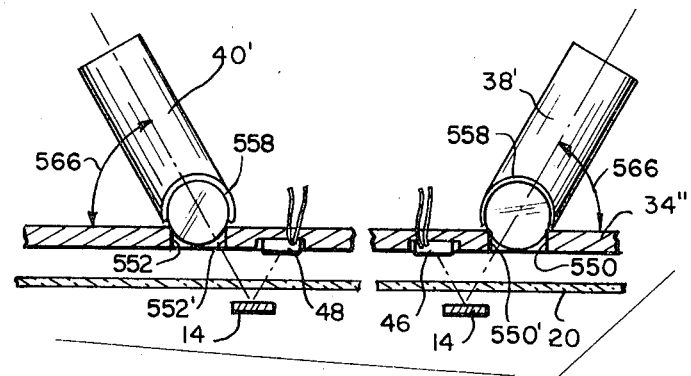
Figure 25:
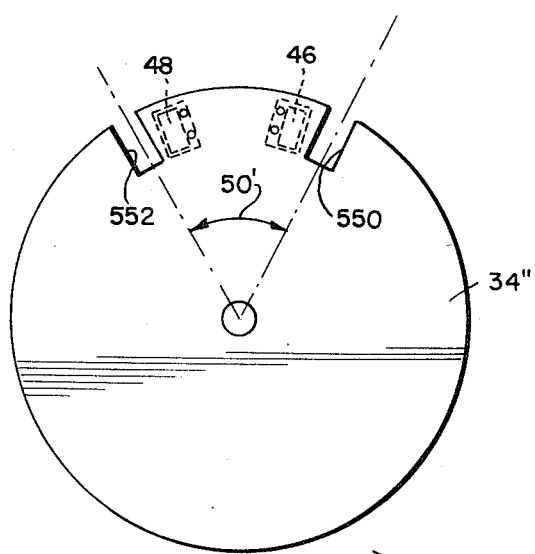
Figure 24:
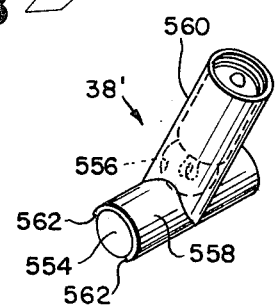

FIG. 15 is a fragmentary, exploded perspective view of yet another embodiment of my invention, this embodiment comprising a plurality of pairs of light-responsive devices peripherally spaced about the path of movement of the indicator of the altimeter and a light source associated with each pair of devices, the indicator being arranged to move between each light source and its associated pair of devices;

FIG. 16 is a block diagram view of an electronic system for registering, i.e., adding and subtracting, the outputs of the light-responsive devices of FIG. 15;

FIG. 17 is a block diagram of an encoder system for registering the outputs of the light-responsive devices of FIG. 15;

FIG. 18 is a fragmentary elevation view showing the preferred embodiment of my encoder and FIG. 18a is another fragmentary view showing spring means for biasing one disc of the encoder;

FIG. 19 is a sectional view taken from FIG. 18 generally along the line 19—19 and showing the contact strips on one of my encoder discs;

FIG. 20 is a block diagram of still another embodiment of my system, which embodiment includes a pair of synchro systems for displaying, respectively, 100 foot and 500 foot increments of altitude;

FIG. 21 is a schematic of a portion of yet another embodiment of my invention, which embodiment includes a cam-operated switch for pulsing synchro transmitters and synchro receivers;

FIG. 22 is a schematic of a checking circuit which is used in conjunction with the synchro systems shown in FIG. 20;

FIG. 23 is a fragmentary sectional view of another preferred light source means;

FIG. 24 is a perspective view of one light projector of the means shown in FIG. 23; and FIG. 25 is a view showing the rotary support on which the means of FIG. 23 is mounted.

Referring now to FIGS. 1–4, one preferred embodiment of my altitude indicating and reporting system will be discussed.

The embodiment of FIGS. 1–4, indicated generally by the reference numeral 10, comprises a standard aircraft altimeter 12 which is equipped with an indicator or pointer 14 arranged for pivotal movement about an axis extending through the point 16 (FIG. 3) and means, indicated generally by the reference numeral 18, for tracking the movement of the indicator 14. As stated previously, the altimeter 12 may be a conventional altimeter which is normally found in the instrument panel of an aircraft. Such an altimeter has a glass cover plate 20 covering and protecting the indicator 14 and the scale about which the indicator moves. My tracking means 18 is arranged to track the movement of the indicator 14 by projecting and reflecting light through this cover plate 20.

The tracking means 18 is mounted in front of this cover plate 20 to be in alignment with the pivot axis of the indicator 14. In the illustrative embodiment of FIGS. 2 and 3, I mount a support plate 22 on the front face 24 of the altimeter by means of two, diagonally spaced apart stand-offs 26, the support plate 22 carrying a centrally located bearing 28 defining a journal axis extending through the pivot axis of the indicator 14.

Figure 3:
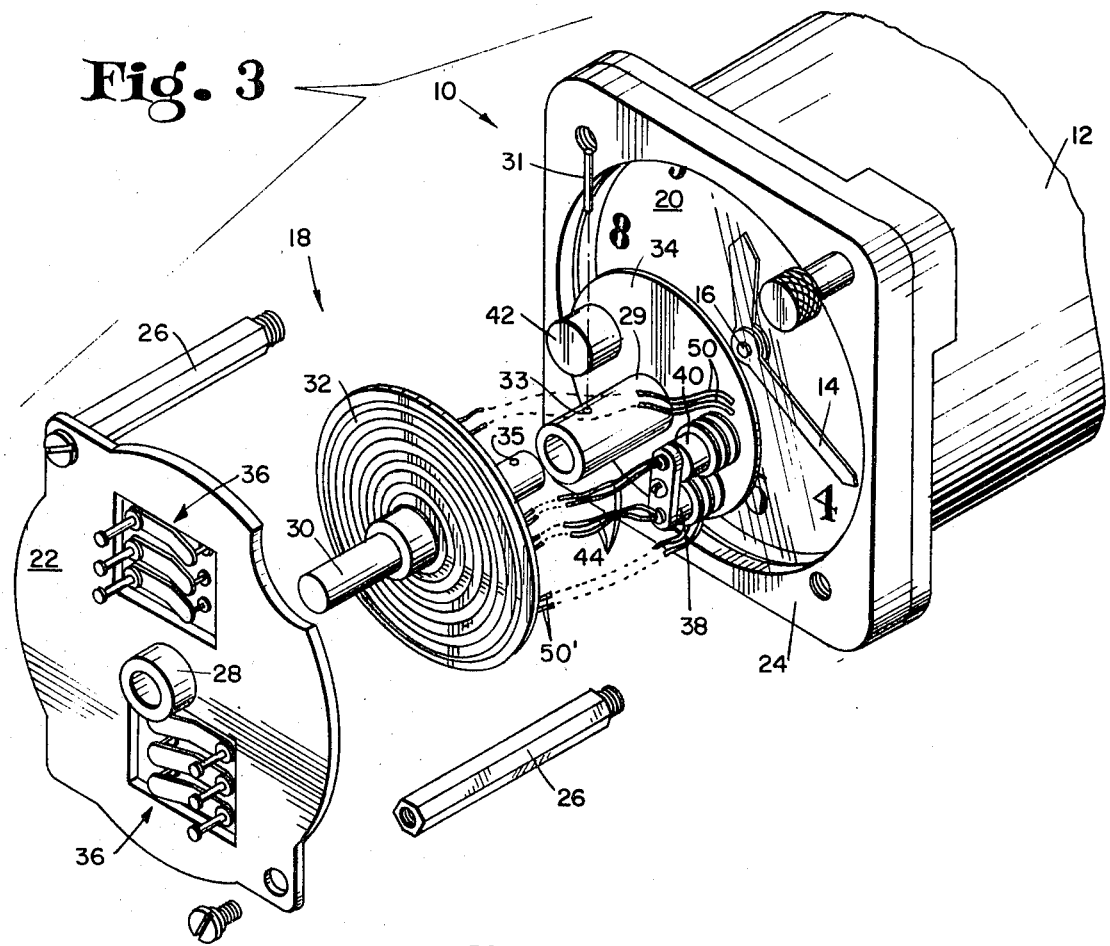
FIG. 3 is an exploded, perspective view, slightly enlarged, showing the optical tracking means of the embodiment of FIG. 1.

The tracking means 18 comprises a shaft 30 journalled in the bearing 28 and a slip-ring commutator 32 and another support plate 34 mounted on the shaft 30 for rotation therewith. In FIG. 3, it will be seen that the plate 34 is carried on a sleeve 29 which is connected to the shaft by a pin 31 which extends through transaxial holes 33 and 35, respectively, in the sleeve and shaft. A plurality of stationary contact members, indicated generally by the reference numeral 36, are mounted on the support plate 22 and arranged to engage, respectively, the circular contact strips of the commutator 32. It will be appreciated that the commutator 32 and the contact members 36 comprise a rather conventional slip-ring assembly for providing electrical contact between a stationary assembly and a rotary assembly.

I have provided a pair of light sources 38, 40 mounted on the support plate 34 to direct light through the plate 20 toward the path of movement of the indicator 14. The weight of these light sources 38, 40 is counterbalanced by a weight 42 mounted on the diametrically opposite side of the support plate 34. Each light source 38, 40, the details of which will be discussed in conjunction with FIGS. 2a–2d, is connected by a pair of wires 44 to one of the circular contact strips on the commutator 32.

A light-responsive device 46, 48 is associated with each light source 38, 40, the light-responsive surface of each device facing the path of movement of the indicator 14. A pair of wires 50' is provided for electrically connecting each light-responsive device 46, 48 to its respective circular contact strip of the commutator 32.

Each light-responsive device 46, 48 is mounted on the side of the support plate 34 which faces the cover plate 20. The devices 46, 48 are peripherally spaced apart on the support plate 34 by an angle which is slightly greater than the angle indicated by the reference numeral 50 in FIG. 2b. Specifically, the angle 50 represents the peripheral spacing between the slits 52, 54 associated with each light source 38, 40. Each light-responsive device 46, 48 is peripherally spaced a small angle from its associated slit 52, 54 (FIG. 2b). I prefer to make the angle 50 approximately 72° because altimeters are generally calibrated so that each 36° increment of movement of the indicator 14 corresponds to an altitude increment of 100 feet. This angle 50, i.e., the peripheral spacing between the slits 52, 54, and the reasons therefor will become more apparent as this description progresses.

Each light-responsive device 46, 48 is arranged electrically to change state when the amount of light impinging thereon, i.e., impinging on its light-responsive surface, change to a predetermined degree. Thus, since I project light at the path of movement of the indicator 14, when the indicator moves adjacent to one of the light-responsive devices 46, 48, the indicator will reflect light back toward the device to cause it to change state.

Any number of types of light-responsive devices will electrically change state when the amount of light impinging thereon is changed. Thus, I am not limited to any particular light-responsive device. For instance, there are commercially available light-actuated silicon controlled rectifiers which will permit or prevent current flow depending on the amount of light impinging thereon. Such rectifiers are described, for instance, in the Silicon Controlled Rectifier Manual, third edition, published by the General Electric Company in 1964. Similarly, there are commercially available light-actuated transistors and diodes which will permit current flow or prevent current flow depending on the amount of light impinging thereon. I prefer to use a simple photovoltaic cell for generating an electrical potential upon the incidence of light thereon. Such cells, which are normally fabricated from a material such as selenium or silica, are particularly suited for my system because of their reliability and extremely small size. Presently, I prefer to use such cells which are approximately .125 inch by .250 inch and .050 inch thick, including conductor wire. These cells are fabricated from silicon and will produce approximately 18 microamperes across a microammeter having a measured D.C. resistance of 8,000 ohms when the indicator 14 reflects light back thereon.

Figure 1:
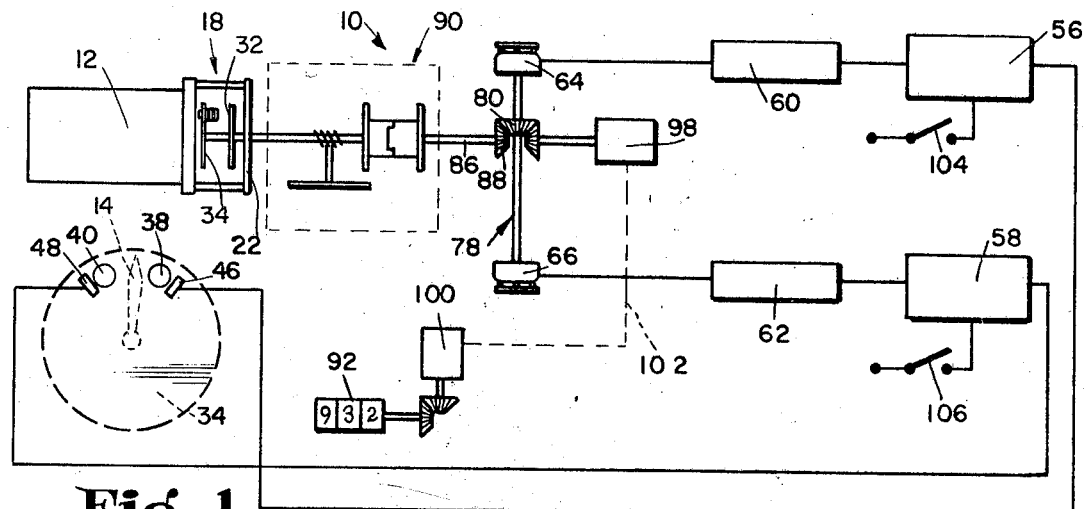
FIG. 1 is a block diagram of one preferred embodiment of my invention.

It is necessary, of course, to amplify the outputs of the light-responsive devices 46, 48 so that these outputs can be used by other electrical equipment. Referring now to the block diagram of FIG. 1 and the schematic diagram of FIG. 4, it will be seen that I have provided such an amplifier for amplifying the output of each light-responsive device 46, 48, these amplifiers being indicated by the reference numerals 56, 58. Each amplifier 56, 58 is coupled to and arranged to energize a silicon controlled switch 60, 62 (sometimes referred to as a silicon controlled rectifier) which is, in turn, connected to and arranged to energize a rotary stepping motor 64, 66. As will be discussed hereinafter, these rotary stepping motors 64, 66 comprise a drive means for the support plate 34 on which the light sources 38, 40 and light-responsive devices 46, 48 are mounted. In FIG. 1, as a matter of convenience, I have shown the support plate 34 in solid-lines adjacent the face 24 of the altimeter 12 and, again, in dashed-lines to illustrate the position of the devices 46, 48 thereon.

Referring now to the schematic of FIG. 4, the manner in which the amplifiers 56, 58 amplify the output of their associated devices 46, 48 to switch on their associated silicon controlled switches 60, 62 will be discussed. Since, preferably, the network between each device 46, 48 and its associated motor 64, 66 is identical, FIG. 4 shows only the network between the device 46 and the motor 64.

The amplifier 56 can be described as a unijunction transistor amplifier or oscillator which I have modified to compensate for the triggering requirements of the silicon controlled switch 60 and the output of the device 46. One of such modifications in the placing of a .5 Mfd capacitor across the outputs of the device 46 and in parallel with the input diode 68 of the amplifier 56. For a discussion of this type of unijunction transistor circuit, I refer to the Transistor Manual published in 1964 by the General Electric Company, and particularly to the discussion of the circuit shown in figure 13.37 on page 326 of that manual.

Figure 4:
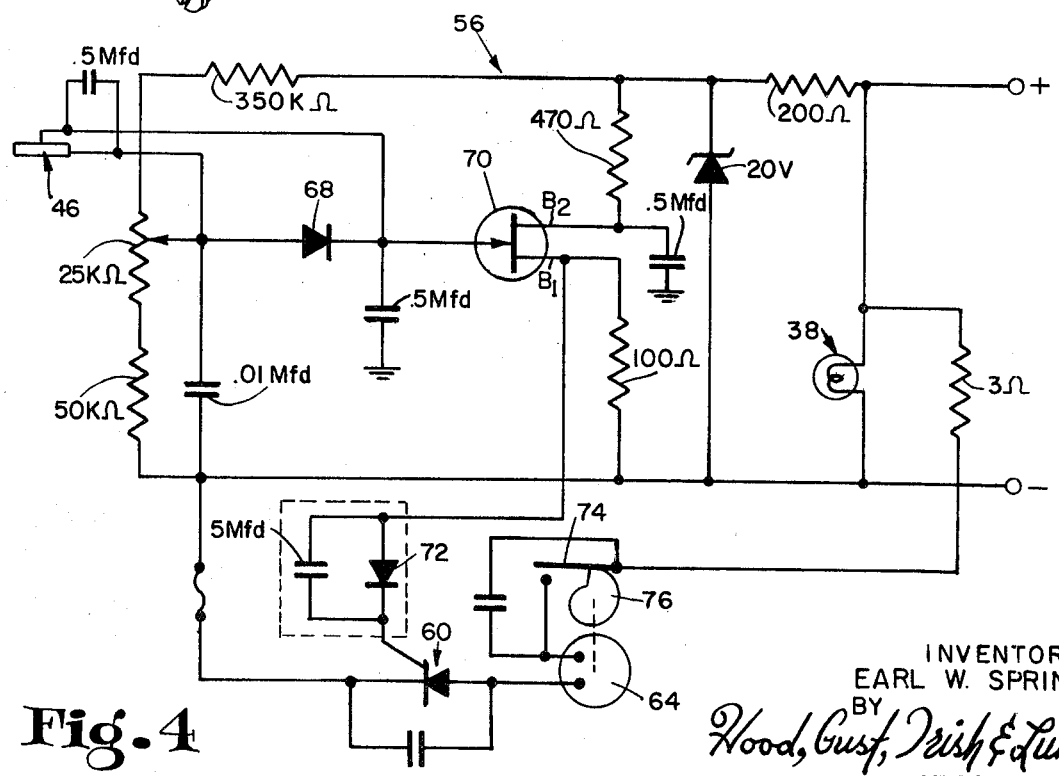
FIG. 4 is a schematic of the amplifier and switching circuit associated with each rotary stepping motor of the embodiment of FIG. 1.

In the circuit of FIG. 4, I have connected the device 46 across a diode 68, the cathode of which is connected directly to the emitter of a unijunction transistor 70. When the device 46 produces a predetermined potential which is applied to the emitter of the transistor 70, the transistor changes state so that current can flow through its base electrodes $B_1$, $B_2$ and the diode 72 to the control gate electrode of the silicon controlled switch 60. When the potential applied to the gate electrode of the switch 60 is sufficiently high, the switch 60 will be turned on to permit current flow through the motor 64, thereby to energize the motor to cause its output shaft to advance one step about its axis. The motor 64 is energized through a switch 74 which is operated by a cam 76 drivingly connected to the motor. The cam 76 is proportioned and designed to open the switch 74, thereby to deenergize the motor, at the end of its one step of advancement. The switch 74 is normally closed and is only opened for an instant by the cam 76 to deenergize the motor 64 and to remove the positive voltage from the anode of the switch 60.

As a matter of convenience, in FIG. 4, I have shown typical values for several of the resistors and capacitors comprising the circuitry. These values are based on an input voltage of between twenty-two volts and thirty volts. The light source 38 is illustrated in FIG. 4 as a simple lamp connected across the voltage source.

It will be appreciated that, when the indicator 14 moves close to the device 46 and reflects light thereon, the motor 64 will be energized to drive the support plate 34 on which the device 46 is mounted about the axis of the shaft 30. Thus, when the motor 64 is so energized, the device is moved away from the indicator and, consequently, the device stops producing a voltage which is sufficient to cause the transistor 70 to permit current flow to the gate of the switch 60.

The motor 64 is arranged to drive the support plate 34 in a step-by-step manner in one direction about the axis of the shaft 30 and the motor 66 is arranged to drive the support plate 34 in a step-by-step manner in the opposite direction about the axis. Each motor 64, 66 is arranged so that, each time it is energized, it will drive the support plate 30 an amount equal to one-half of the angle 50, i.e., approximately one-half the spacing between the devices 46, 48. Thus, once the indicator 14 is between the devices 46, 48, i.e., in the space defined by the angle 50, the support plate 34 will be driven, in a step-by-step manner, to keep the devices 46, 48 on opposite sides of the indicator 14. That is, as the indicator 14 approaches one of the devices 46, 48 and reflects light toward that device, the support plate 34 will be driven or jerked to move the device away from the indicator. I prefer that the motors 64, 66 be arranged to provide a very fast action movement of the plate 34. For a description of the rotary stepping motors 64, 66, I refer to United States Pat. 2,496,880 issued Feb. 7, 1950 and United States Pat. 2,501,950 issued Mar. 28, 1950. I do not, however, intend to be limited to such motors because any number of types of solenoid devices can be arranged to provide a snap-action rotational movement.

Figure 2:
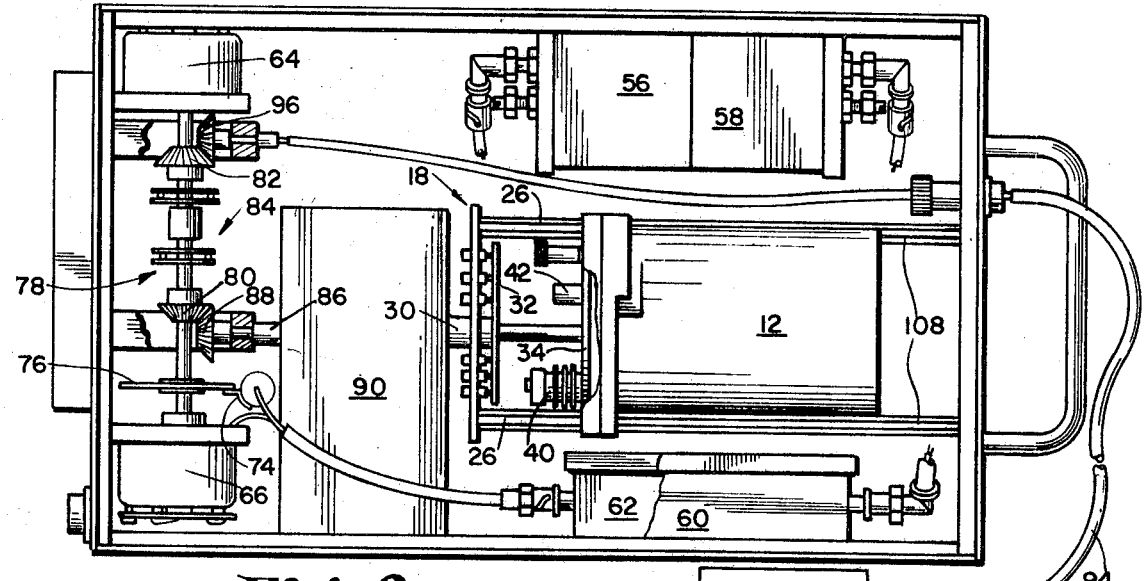
FIG. 2 is an elevational view showing the embodiment of FIG. 1 packaged in a container for mounting in an aircraft.
Figures 2A, 2B, 2C:
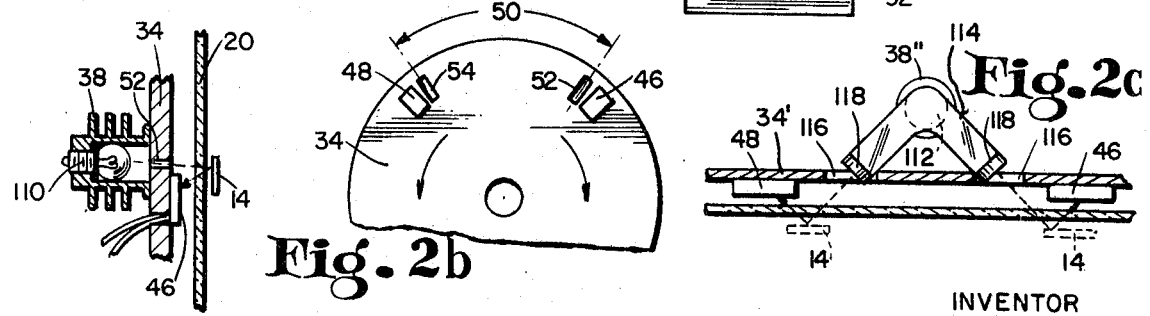
FIG. 2a is a fragmentary sectional view, enlarged, showing how light may be directed at and reflected from the indicator of an altimeter.
FIG. 2b is a fragmentary view showing the peripheral spacing between the light-responsive devices carried by the rotary support.
FIG. 2c is a fragmentary sectional view showing one light source used in combination with two peripherally spaced apart light-responsive devices.

In the illustrative embodiment of FIG. 2, I have arranged the motors 64, 66 to drive a common shaft means 78 which carries bevel gears 80, 82. The shaft means 78 includes misalignment coupling and detent means, indicated generally by the reference numeral 84, which need not be discussed in this description. The shaft 30 is drivingly connected to the shaft means 78 by means of a shaft 86 which carries a bevel gear 88 drivingly engaged with the bevel gear 80. The shaft 86 extends through an encoder assembly 90 and constitutes an input shaft means for the encoder assembly. In FIG. 2, the encoder assembly is shown as a box through which the shaft 86 extends. The details of the encoder will be discussed in conjunction with FIGS. 18 and 19. It will be apparent, however, that the encoder 90 is driven by the motors 64, 66 which drive the support plate 34 on which the devices 46, 48 are mounted. That is, the encoder 90, which provides the pulse group output of my system, is driven in a step-by-step manner by the same means which drives the support plate 34 to track the indicator 14.

In order to provide the pilot of an aircraft with assurance that my system is indicating the proper altitude, I have provided a bidirectional counter 92 which is drivingly connected by means of a flexible cable 94 and bevel gear 96 to the bevel gear 82 carried by the shaft means 78. This counter 92 constitutes the visual numerical display device referred to previously. In the block diagram of FIG. 1, I show the counter 92 drivingly connected to the shaft means 78 by means of a synchro transmitter 98 drivingly connected to the bevel gear 80, a synchro receiver 100 drivingly connected to the counter and appropriate circuit means, indicated by the reference numeral 102, connecting the transmitter 98 and receiver 100.

Also in FIG. 1, I show a manually-operated switch 104, 106 operatively connected to each amplifier 56, 58. These switches are provided so that the motors 64, 66 can be energized to move the plate 34 to position the devices 46, 48 on opposite sides of the indicator. It will be appreciated that such an action will be required after the system 10 has been deenergized and the indicator 14 has moved to a position where it is no longer in the space indicated by the reference numeral 50 in FIG. 2b. This will occur, of course, when the aircraft is on the ground and there is an atmospheric change while the system 10 is deenergized. After the system 10 is energized, the pilot of the aircraft can manipulate the switches 104, 106 until his display counter 92 shows the altitude which he is reading from his primary altimeter mounted in the instrument panel of the aircraft. It will also be possible to monitor the output of the encoder 90 and to drive the plate 34 and, consequently, the encoder until the output is the equivalent of the altitude indication of the primary altimeter.

As illustrated in FIG. 2, I have packaged my system 10 in a container which is suitable for installation in an aircraft, which container is 3½″ by 12½″ by 7⅝″. The altimeter 12 is supported in the container by means of a pair of stand-offs 108 extending inwardly from the right-hand end (FIG. 2) of the container. Such a method of mounting equipment is well known and does not need to be discussed, in detail, in this description.

Referring now to FIG. 2a, it will be seen that the light source 38, which is identical to the light source 40, comprises a light 110 enclosed in a housing which is arranged to direct light through the slit 52 and toward the path of movement of the indicator 14. The indicator 14 will, as stated previously, reflect the light back toward the device 46. The structure of FIG. 2a is rather simple, but effective.

Referring now to FIG. 2c, a slightly more sophisticated system for projecting light toward the path of the indicator 14 will be discussed. The structure of FIG. 2c comprises a single light source 112 and an inverted V-shaped tubular member 114 which is arranged to direct light through two peripherally spaced apart openings 116 in the plate 34′. I have provided a lens 118 in the lower end of each leg of the member 114, which lens is arranged to collimate the light projected toward the indicator 14 to improve the definition of the point at which the indicator will cause the devices 46, 48 to change state. That is, the lens 118 prevent scattering of the light and produce two well defined beans of light which can be reflected back toward the devices 46, 48. The result of this is that each device 46, 48 will more rapidly change state when the indicator 14 moves adjacent thereto.

Referring now to FIGS. 23, 24 and 25, another system for projecting light toward the path of the indicator 14 will be discussed, this system comprising a pair of light sources 38′, 40′ which are peripherally spaced apart on a support plate 34″. The support plate 34″ is formed to provide a radially extending slot 550, 552 through which each light source 38′, 40′ projects light, the slots 550, 552 being peripherally spaced apart by the angle indicated at 50′.

The light-responsive devices 46, 48 associated, respectively, with the light sources 38′, 40′ are disposed between the slots 550, 552 for the light sources as illustrated in FIGS. 23 and 25. Thus, the angle between the light-responsive devices 46, 48 is slightly less than the angle indicated by the reference numeral 50. It will be remembered that the spacing between the devices 46, 48 is slightly greater than the angle 50 between the slits 52, 54 in FIG. 2b. Thus, the angles 50, 50′ represent approximately the peripheral spacing between the point at which the indicator 14 will reflect light on and energize the device 46 and the point at which the indicator 14 will reflect light on and energize the device 48. It is for this reason that, in this specification, the spacing between the devices 46, 48 is defined as being approximately twice the amount which either rotary stepping motor 64, 66 is capable of driving the support plate 34 in one step.

The light source 38′, which preferably is identical to the light source 40′, comprises a cylindrical light rod 554, a portion of which is received in the slot 550 as illustrated in FIG. 23. This light rod 554 may be a clear plastic or glass rod which is, for instance, approximately ¼ inch in diameter and ½ inch long. When the rod 554 is in the slot 550, the axis of the rod extends radially outwardly from the axis of the support plate 34″ and parallel to the plane defined by the path of movement of the indicator 14. A lamp 556 is arranged to project light transversely through the rod 554 and the slit 550 toward the path of movement of the indicator 14. In the illustrative embodiment of FIGS. 23 and 24, the light source 38′ includes a housing defined by a sleeve 558 peripherally engaging the rod 554 and a tube 560 connected to the sleeve at a point intermediate its ends to be in communication therewith. The lamp 556 is disposed in this tube 560 to be adjacent the rod 554. I prefer that the lamp 556 be an ordinary instrument which is rated for operation at 28 volts and I prefer to connect a 20 volt Zener diode across the light to assure its reliable operation.

The sleeve 558 is provided with a longitudinally extending slit, the longitudinally extending edges of which are indicated at 562. Thus, the light source 38′ is arranged so that the light produced by the lamp 556 is projected transversely through the rod 554 and the slit in the sleeve 558 and the slot 550 in the support plate 34″. Since the light is projected transversely through the rod 554, it is refractively bent to produce a sharply defined radially extending shaft of light which is as long as the rod. The shaft of light will impinge upon the indicator 14 as illustrated in FIG. 23 to be reflected back toward the light-responsive device 46. The tube 560, which is mounted on the sleeve 558 to be generally opposite the slit defined by the edges 562, is arranged to project the light transversely to the rod 554.

I have found that it is desirable to arrange each light source 38', 40' so that its tube 560 is inclined at an acute angle indicated by the reference numeral 566 relative to the plane defined by the path of movement of the indicator 14, which plane, in the illustrative embodiment, is parallel to the plate 34". I have further found that it is desirable if this angle 566 is approximately 60°. Thus, I project light at an angle of approximately 60° relative to the plane defined by the path of movement of the indicator 14 and the light is reflected, of course, at a similar angle from that plane.

The spacing between the edges 562 defining the longitudinally extending slit in the sleeve 558 need only to be spaced apart by an amount which is sufficient to permit passage of the relatively thin shaft of light which is projected toward the path of movement of the indicator 14. As is clearly shown in FIG. 23, I may use the edge 550', 552' of each slot 550, 552 further to define the shaft of light which is projected by the light source 38', 40', toward the path of movement of the indicator 14.

I have found that it is desirable to position the support plate 34 so that, when it is in any one of the ten positions about the face of the altimeter 12 to which it may be driven by the rotary stepping motors 64, 66, the light projected by each light source 38, 40 impinges on the face of the altimeter at a point which is in between the scale numbers spaced peripherally about the face. This is because such scale numbers are conventionally white numbers on a black background and such white numbers will tend to reflect light which is projected directly thereon back toward the light-responsive devices 46, 48. Conventionally, the indicator 14 is also white. Thus, by so positioning the support plate 34, the light projected by each source 38, 40 will be reflected back toward the devices 46, 48 only by the indicator 14. I point out, however, that this is not an absolute requirement and, in some cases, it may be perfectly satisfactory simply to ignore the light which is reflected by the scale numbers on the face of the altimeter.

The above-described embodiment of FIGS. 1–4 will provide an output which can be communicated by a transponder from an aircraft to a ground station. That is, each time the support plate 34 is driven to track the indicator 14, the encoder 90 will be driven to provide a pulse group series output representing the new position of the plate 34 which, in effect, represents the position of the indicator 14. The encoder 90 is, therefore, driven in one direction by one of the motors 64, 66 to add increments of altitude and driven in the opposite direction by the other motor to subtract increments of altitude. In this manner, the encoder 90 registers the position of the indicator 14. In the preferred embodiment, the encoder 90 will add 100 foot increments of altitude as the aircraft climbs and subtract like increments of altitude as the aircraft descends. Each 36° movement of the support plate 34 represents a 100 foot increment of altitude. It is for this reason that I refer to the encoder 90 as a register.

Figure 5:
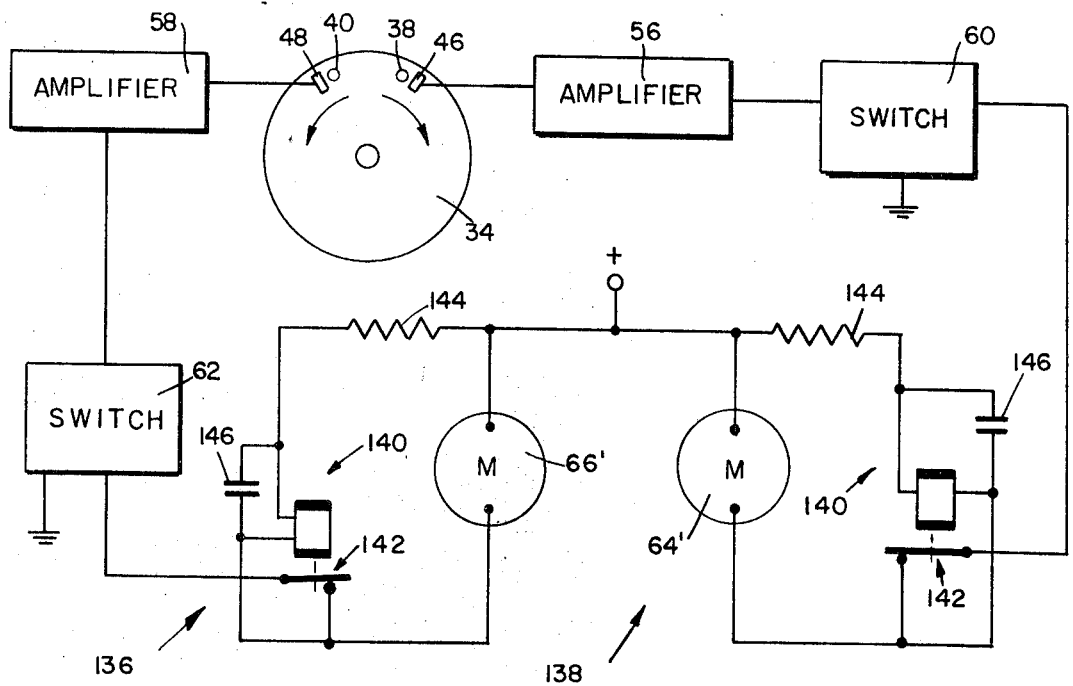
FIG. 5 is a block diagram of a slightly different circuit arrangement for energizing and deenergizing the rotary stepping motors utilized in my system.
Figure 6:
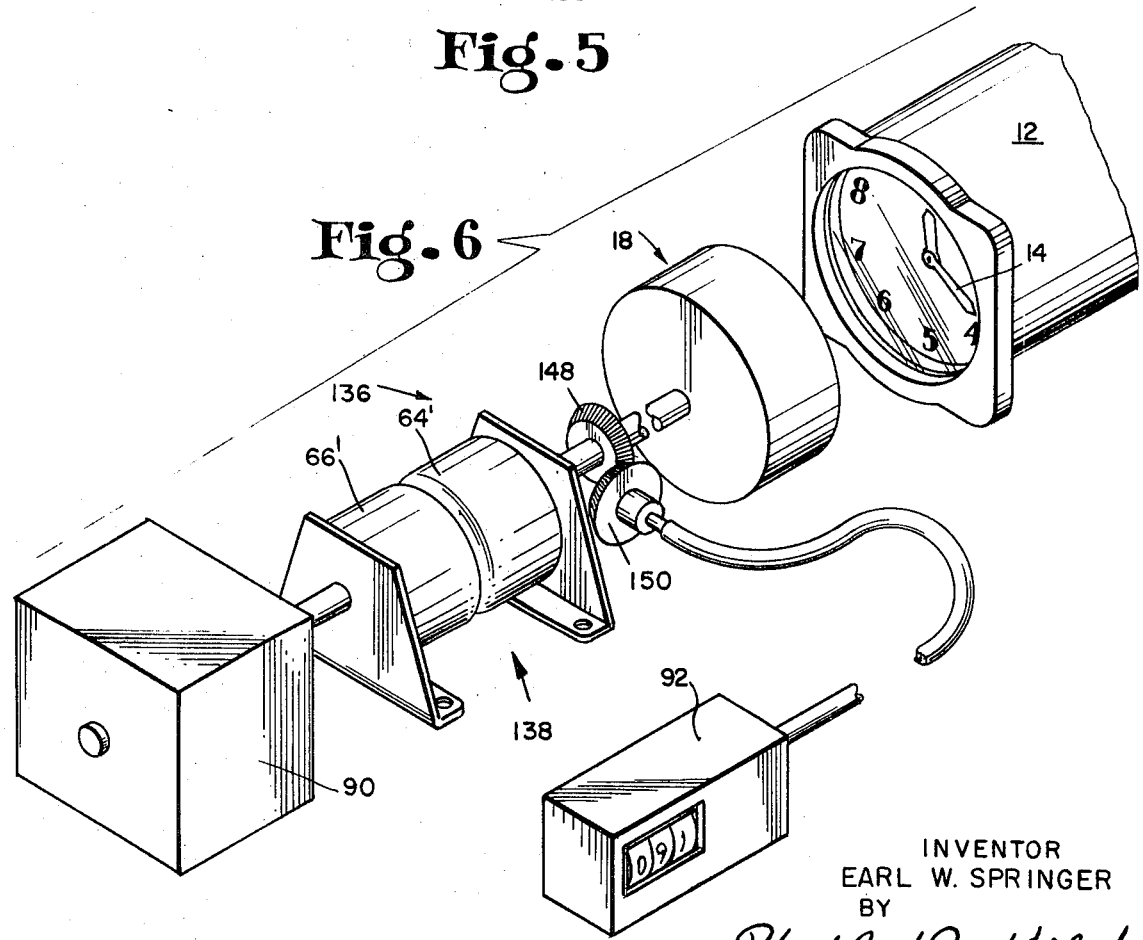
FIG. 6 is a fragmentary, exploded perspective view of a slightly different embodiment of my invention, this embodiment comprising a different type of rotory stepping motors which are particularly suited for use with the circuitry of FIG. 5.

Referring now to FIGS. 5 and 6, another slightly different embodiment of my system will be discussed. The embodiments of FIGS. 5 and 6, indicated generally by the reference numeral 136, comprises an altimeter 12, a tracking means 18, an encoder 90 and a counter 92, each of which is, for all practical purposes, identical to the correspondingly numbered sub-assembly in FIGS. 1–4. It is for this reason, that the tracking means 18 and encoder 90 are shown in block form.

The system 136 utilizes a driving means 138 comprising a pair of oppositely directed rotary stepping motors 64', 66'. Each motor 64', 66' is energized by a silicon controlled switch 60, 62 in the same manner discussed in conjunction with the system 10 (FIGS. 1–4). I have provided circuit means 140 for deenergizing each motor 64', 66' a predetermined time period after it is energized to step the tracking means 18 and encoder 90. Each circuit 140 includes a relay 142 for disconnecting the motor 64', 66' from its power source and a resistor-capacitor network energizing the relay 142 a predetermined time after the motor is energized, this network including the illustrated resistor 144 and capacitor 146. I can select values for the resistor 144 and capacitor 146, the capacitor being connected across the coil of the relay 142, so that the circuit energizing the motor 64', 66' will be opened at a desirable time. Thus, I can control the time at which the rather large inductive surges resulting from deenergizing the motor 64', 66' is applied to the amplifiers 56, 58 and switches 60, 62. It will be appreciated by those skilled in the art that such surges, applied at the wrong time, can cause undue oscillation of the amplifiers 56, 58 and energizing of the switches 60, 62.

For a description of the drive means 138, I refer to U.S. Pat. 2,959,969 issued Nov. 15, 1960. This rather compact drive means 138 permits me to provide a system which is somewhat less complicated than that illustrated in FIG. 2. Specifically, the only gears required in the structure of FIG. 6 are those gears 148 and 150 arranged drivingly to connect the counter 92 to the drive means 138.

Figure 7:
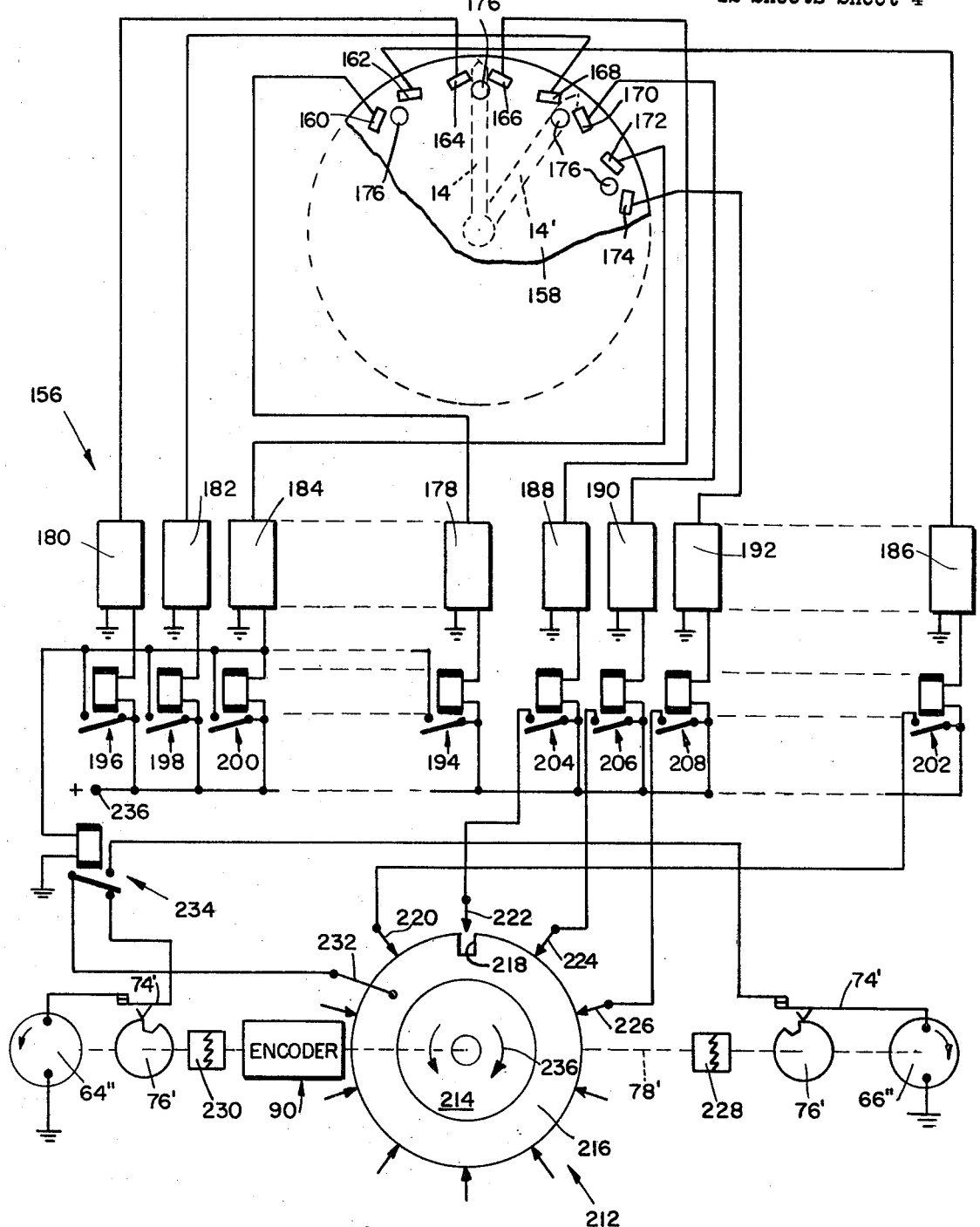
FIG. 7 is a block diagram of another embodiment of my invention, which embodiment utilizes a plurality of pairs of light-responsive devices peripherally spaced about the face of an altimeter to be adjacent the path of movement of the indicator of the altimeter.

Referring now to FIG. 7, another embodiment of my invention indicated generally by the reference numeral 156, will be discussed. This embodiment 156 comprises a stationary support plate 158 which is disposed adjacent the path of movement of the indicator 14 of an altimeter. A plurality of pairs of light-responsive devices is peripherally spaced about the path of movement of the indicator 14, the peripheral spacing between the pairs preferably being the equivalent of a 100 foot increment of altitude. In FIG. 7, only four pairs of devices are illustrated, these pairs being indicated by the reference numerals 160 and 162, 164 and 166, 168 and 170, and 172 and 174. These devices 160–174 may be identical to the devices 46, 48 discussed previously.

A light source 176 is mounted on the support plate 158 in between the light-responsive devices of each pair and arranged to project light toward the path of movement of the indicator 14. These light sources 176 may be identical to the light sources 38, 40 discussed previously. Each of the devices 160, 164, 168, 172, i.e., the counterclockwise device of each pair, is connected to an amplifier 178, 180, 182, 184. Similarly, each of the devices 162, 166, 170, 174, i.e., the clockwise device of each pair, is connected to an amplifier 186, 188, 190, 192. The system of FIG. 7, of course, comprises twenty such amplifiers 178–192, i.e., two amplifiers for each pair of light-responsive devices. In order to simplify the showing of FIG. 7, I have not shown six pairs of light-responsive devices and twelve amplifiers.

Each amplifier 178, 180, 182, 184 is arranged to energize a relay 194, 196, 198, 200 when light is reflected on the device 160, 164, 168, 172 connected thereto. Similarly, each of the amplifiers 186 is arranged to energize a relay 202, 204, 206, 208 when the device 162, 166, 170, 174 connected thereto is energized by light reflected thereon. Each of these relays 194–208 constitutes a two-state switch means which, in one of its states, opens a circuit and, in the other of its states, closes a circuit. It will be recognized that such relays are the equivalent of, for instance, a silicon controlled switch which will permit current flow through its anode-cathode circuit when a proper potential is applied to its gate-control electrode.

The system 156 comprises an encoder 90 and a pair of oppositely directly rotary stepping motors 64", 66" arranged to drive the encoder to register the position of the indicator 14. In FIG. 7, I show the motors 64", 66" arranged to drive a common shaft means 78' and the encoder 90 connected directly to the shaft means 78'. A cam-operated switch 74' is arranged to deenergize each motor 64", 66" after it has been energized to drive the encoder 90, the switch 74' being operated by a cam 76' driven by the motor.

In order to provide a directional sense to the drive system for the encoder 90 of the system 156, I have provided a rotary switch means 212 drivingly connected to the motors 64", 66". In FIG. 7, the rotary switch means 212 comprises a rotor 214 mounted on the shaft means 78' and providing a peripherally extending contact strip 216 having a gap 218 formed therein. A stator contact member 220, 222, 224, 226 is connected to each relay 202, 204, 206, 208, the stator contact members being equally peripherally spaced about the contact strip 16 so that one of the contact members overlies the gap 218. Of course, there are ten such stator contact members. Clutch means 228, 230 are disposed on opposite sides of the rotary switch means 212 so that its rotor 214 can be driven in either direction by the motors 64", 66". A common contact member is arranged continually to engage the contact strip 216 so that it is always in electrical contact with nine out of the ten stator contact members 220–226. A relay 234 is arranged alternatively to connect the motors 64", 66" to the common contact member 232, the relay being arranged so that, when it is deenergized, the motor 64" is connected to the contact member 232 and, when it is energized, the motor 66" is connected to the contact member 232. The relay 234 will be energized when any one of the relays 194–200 is energized by the amplifier 178–184 connected thereto. Specifically, each of the relays 194–200 is arranged so that when it is energized it will permit current flow from the power terminal 236 through the coil of the relay 234. Each of the relays 202–208 is arranged so that, when it is energized, it will connect its associated stator contact member 220–226 to the power terminal 236. The rotary switch 212 is of the open-circuit-seeking type in that it will energize one of the motors 64", 64" to drive the rotor 214 until there is an open-circuit condition between the relay 202–208 which is energized and the contact strip 216. That is, since both of the motors 64", 66" must be energized through one of the relays 202–208 and the contact strip 216, one of the motors will be energized until there is an open-circuit condition established between the one relay 202–208 which is energized and the contact strip 216.

When the indicator 14 is substantially centered between the light-responsive devices 160 and 162, 164 and 166, 168 and 170, 172 and 174, comprising each pair of devices, the pair will be energized and the two amplifiers 178–192 connected, respectively, thereto will be energized. For instance, when the indicator 14 is in its illustrated vertically extending position centered between the devices 164, 166, both of the devices and the amplifiers 178, 188 connected thereto will be energized. Note, however, that the relay 204 controlled by the amplifier 188 is not in contact with the contact strip 216 because the contact member 222 is in registry with the gap 218. Thus, with the rotary switch means 212 and the indicator 14 in the positions illustrated, both motors 64", 66" are deenergized. If the indicator 14 moves counterclockwise as viewed in FIG. 7 to the position indicated at 14', since there is an open-circuit condition between the contact member 222 and the contact strip 216, neither motor 64", 66" will be energized until the indicator reaches the position 14' and the two devices 168, 170 at that position are both energized. When the devices 168, 170 are so energized, the amplifiers 182, 190 are energized and since there is contact between the stator contact member 224 connected to the relay 206 which is energized by the amplifier 190 and since the relay 234 is energized by the amplifier 182 to connect the motor 66" to the contact member 232, the motor 66" will drive the rotary switch means 212 and the encoder 90 in the direction of the arrow 236 until the gap 218 is in registry with the stator contact member 224. Once there is established an open-circuit condition between the contact member 224 and the contact strip 216, the indicator can move approximately 36° in either direction from its position illustrated at 14' without energizing either motor 64", 66". Once the indicator moves a full 36° in either direction from its position 14', one of the motors 64", 66" will be energized again to drive the rotary switch means 212 and encoder 90 to a new position which corresponds to the new position of the indicator.

Since the motor 66" drives the rotary switch means 212 and encoder 90 when the indicator 14 moves clockwise, and since clockwise movement of the indicator indicates an increase in altitude, the motor 66" is considered an adding means or a means for operating the encoder 90 to add increments of altitude. Similarly, the motor 64", which will drive the rotary switch means 212 and encoder 90 when the indicator moves counterclockwise, can be considered as a subtracting means or a means for operating the encoder to subtract increments of altitude.

I believe that an important feature of the system 156 (FIG. 7) is the direction sensing capability provided by the rotary switch means 212 and the use of pairs of light-responsive devices peripherally spaced about the path of movement of the indicator. The rotary switch means 212, therefore, functions as a memory device, i.e., a device for remembering the position from which the indicator 14 has moved.

My system 156 likewise can utilize an altimeter in its "off-the-shelf" condition. It will also be appreciated that the system 156 is not particularly sophisticated. Although the system 156 does comprise twenty separate amplifiers, it will be appreciated that these amplifiers must only be sufficiently sophisticated to sense an output of a light-responsive device and to provide an output which is sufficient to energize a relay.

It will further be appreciated that each amplifier 178–192 and its associated relay 194–208 can, if desired, be replaced by a light-actuated silicon controlled switch. In such a case, the switches may be mounted directly on the support plate 158.

Figure 8:
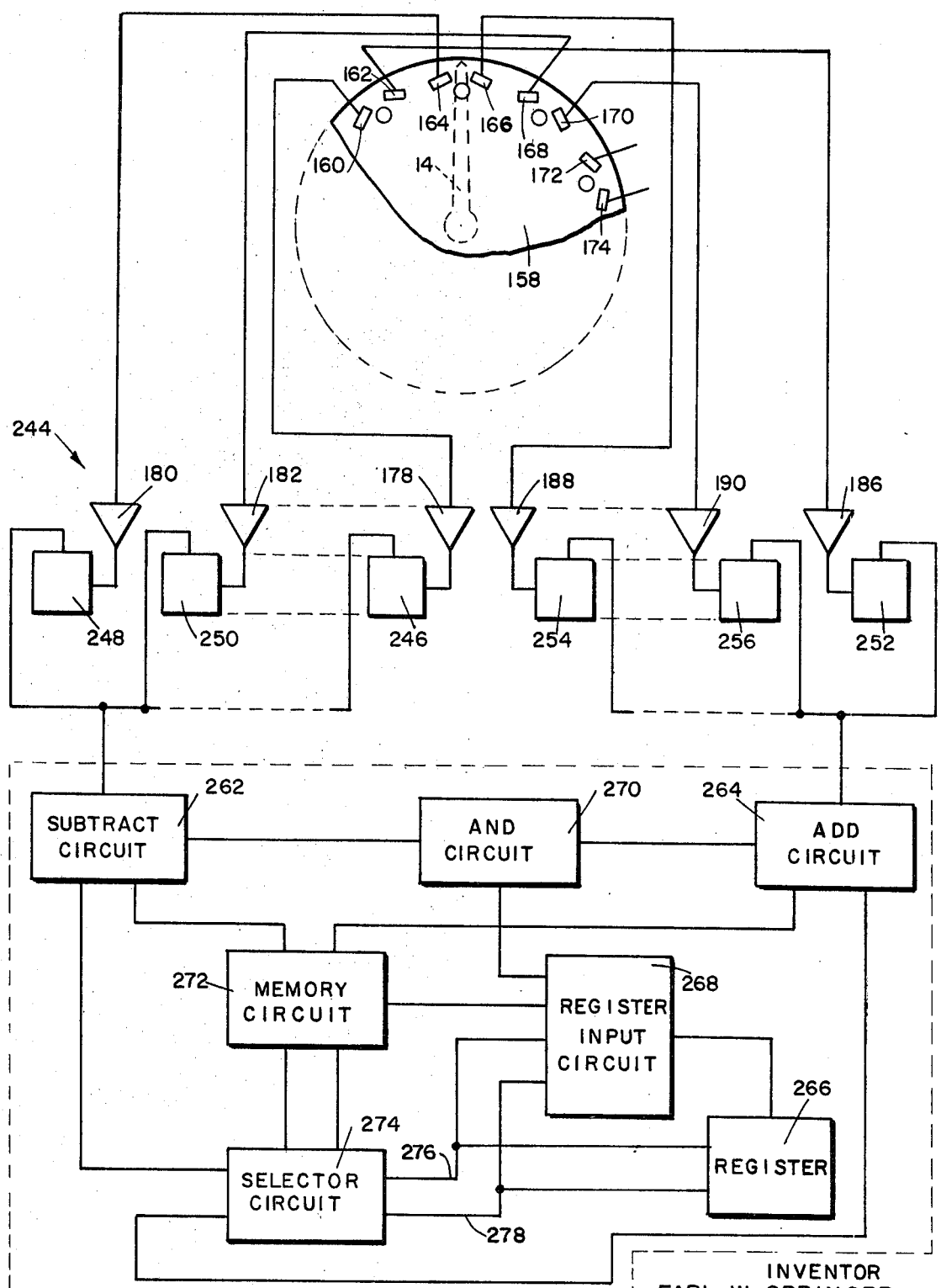
FIG. 8 is a block diagram of another embodiment of my invention, which embodiment constitutes an electronic analogy of the embodiment of FIG. 7.

Referring now to FIG. 8, another embodiment of my invention, indicated generally by the reference numeral 244, will be discussed. This embodiment 244 is an electronic analogy of the electro-mechanical system 156 (FIG. 7). The embodiment or system 244 comprises ten pairs of light-responsive devices equally peripherally spaced about the path of movement of the indicator 14, the output of each device being connected to an amplifier. As a mattery of convenience, I have only illustrated four of the ten required pairs of light-responsive devices and six of the twenty required amplifiers in FIG. 8. The reference numerals applied to the illustrated devices correspond to the reference numerals applied in FIG. 7. Each amplifier 178, 180, 184, 186, 188, 190 is arranged to energize a switch means 246, 248, 250, 252, 254, 256 when the light-responsive device connected thereto is energized by the light reflected thereon. These switch means 246–256 may be any number of types of two-state switching devices, such as transistors, silicon controlled switches, etc., i.e., a device which will, in one state, block current flow or a particular level of current flow, and, in the other of its states, permit current flow.

I have drawn a dashed-line box 260 about a portion of the circuitry of the embodiment of FIG. 8. The circuitry in this box 260 will perform electrically the function of the motors 64", 66", rotary switch means 212, relay 234 and encoder 90 comprising the system 156 of FIG. 7. Specifically, the output of the counterclockwise device of each pair of light-responsive devices is amplified to operate a switch means 246, 248, 250 which, in turn, applies a pulse of current to a subtract circuit 262 and the output of the clockwise device of each pair is amplified to operate a switch means 252, 254, 256 which, in turn, applies a pulse to an add circiut 264, the circiuts 262, 264 comprising the circuitry in the box 260. Also inside the box 260 is a register 266, a register input circuit 268, an AND circuit 270, a memory circuit 272 and a selector circuit 274. Each of these circuits 262–274, which are shown in block diagram form in FIG. 8, is quite common to the computer arts and engineers familiar with that art will recognize that they are quite common. For instance, the Transistor Manual referred to previously discloses circuitry which, when properly interconnected, will provide the desired results. The register 266, for instance, may comprise a bank of bistable multi-vibrators, commonly called flip-flop circiuts, each of which is arranged to energize or deenergize a relay, depending on the state to which it has been switched by a pulse input. Each of such relays can provide one bit of the pulse group series required for transmitting altitude indications to a ground station.

The register input circuit 268 is arranged to feed an input to the register 266 upon the receipt of a proper input from the AND circuit 270 and the memory circuit 272 as well as a proper input from one of the two outputs 276, 278 of the selector circuit 274. Thus, the circuit 268 may comprise another AND circuit which will provide an output only upon the receipt of an input from each of the circuits 270 and 272 and an OR circuit which will provide an output upon the receipt of a pulse from either the output 276 or the output 278. As will be discussed hereinafter, whether the register 266 is operated to add an increment of altitude or to subtract an increment of altitude will depend on which of the two outputs 276, 278 of the selector circuit 274 is applied to the register input circuit 268. Thus, the register 266 must include circuit means for detecting which of the two outputs 276, 278 is present at the time of receipt of an input from the circuit 268. In other words, if one of the outputs 276, 278 is present, the register must be operated to add an increment of altitude and, if the other output is present, the register must be operated to subtract an increment of altitude.

The AND circuit 270 will not provide an input to the register input circuit 268 until it receives an input from the subtract circuit 262 and an input from the add circuit 264. Since the system of FIG. 8 is analogous to the system of FIG. 7, the only time that there will be an output from circuits 262, 264 is when the indicator 14 is substantially centered between one of the pairs of light-responsive devices. Thus, the register 266 will not add or subtract increments of altitude until the indicator moves through an arc of 36°.

The selector circuit 274 is arranged so that, after it receives an output from both the subtract circuit 262 and add circuit 264 indicating that the indicator 14 is centered between a pair of light-responsive devices, it will provide an output corresponding to the last of its inputs to disappear. Thus, the selector circuit 274 will provide an output which will cause the register 266 to add an increment of altitude if the indicator 14 moves clockwise or an output which will cause the register 266 to subtract an increment of altitude if the indicator moves counter-clockwise.

The memory circuit 272 performs the same function as the rotary switch 212 discussed in conjunction with FIG. 7. That is, the memory circuit establishes the position of the indicator 14 and prevents the register from being operated to add or subtract increments of altitude when the indicator oscillates past light-responsive devices without moving a full 36°. The memory circuit 272 receives inputs from the selector circuit 274 so that it can remember whether the register 266 has just been operated to add or to subtract and it receives inputs from the subtract circuit 262 and add circuit 264. The memory circuit 272 is arranged so that, after the register 266 has been operated to add an increment of altitude, it will not provide an input to the circuit 268 until it receives an input from the subtract circuit 262 and, conversely, so that after the register 266 has been operated to subtract an increment of altitude, it will not provide an input to the circuit 268 until it receives an input from the add circuit 264.

Since a ten-stage ring counter is the electronic equivalent of a ten-stage rotary switch, the memory circuit 272 may be such a ring counter. Ring counters are also well known circuits to those familiar with the computer arts.

It will be appreciated that, with the exception of the output relays of the register 266, the system 244 illustrated in FIG. 8 has no moving parts. In fact, the output relays of the register 266 can be replaced by silicon controlled switches which are alternatively conductive or non-conductive, depending on the state of the bistable multi-vibrator to which each switch is connected.

Figure 9:
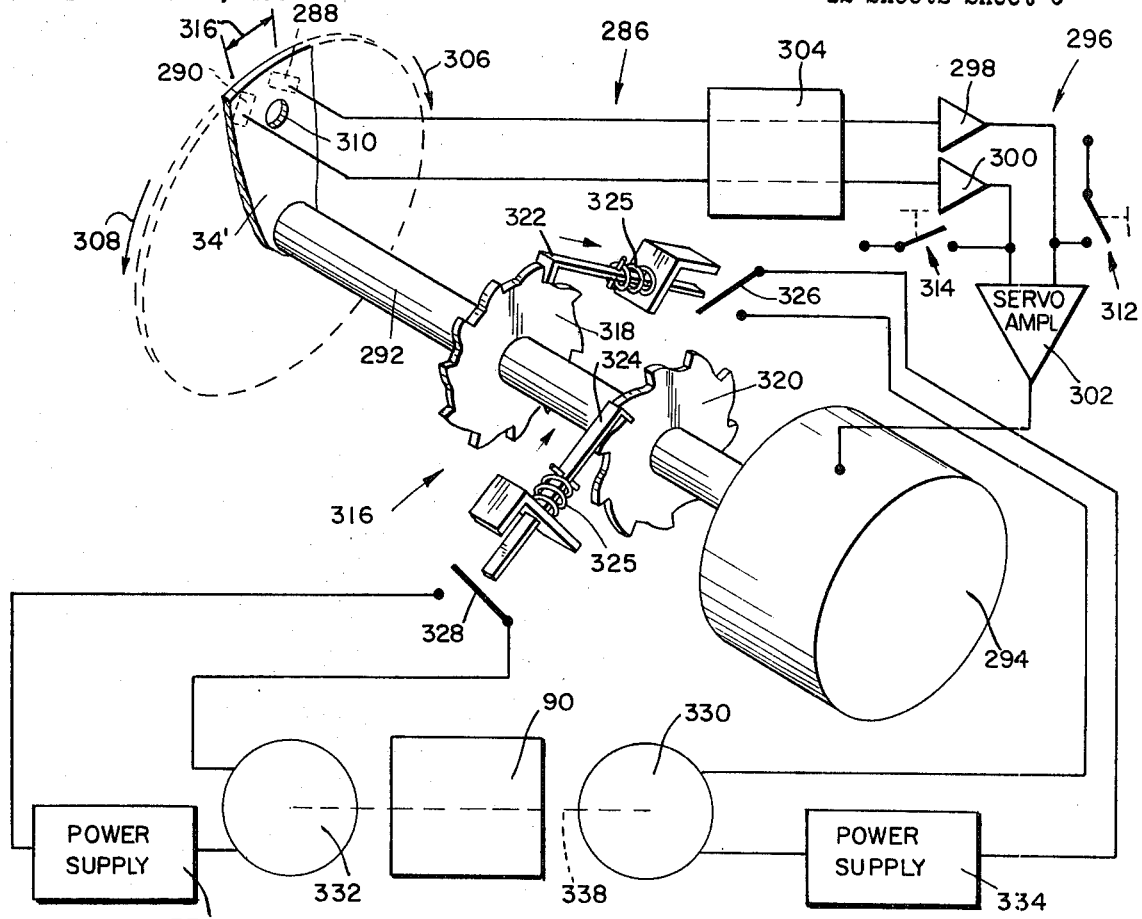
FIG. 9 is a block diagram of still another embodiment of my invention, this embodiment comprising a servo motor for driving the support on which the two light-responsive devices are carried, pulse means operated by movement of the support means by the servo motor, and encoder means for adding and subtracting the output of the pulse means.

Referring now to FIG. 9, another embodiment of my invention, indicated generally by the reference numeral 286, will be discussed. This embodiment comprises a rotatable support plate 34' which carries a pair of peripherally spaced apart light-responsive devices 288, 290. The plate 34' is mounted on a shaft 292 for rotation therewith, the axis of the shaft being coincident with the axis of the altimeter 12 (not shown in FIG. 9) and the plate being disposed adjacent the path of movement of the indicator 14. A servo motor 294 is drivingly connected to the shaft 292, the motor being operatively connected to the outputs of the devices 288, 290 by means of a servo amplifying system 296 comprising an amplifier 298, 300 connected to the output of each device 288, 290 and a servo amplifier connected to the outputs of the amplifiers 298, 300. Slip rings, indicated generally by the reference numeral 304, are provided for connecting the devices 288, 290 to their respective amplifiers 298, 300. Slip rings are necessary because the plate 34' must rotate through several revolutions in order to track continually the indicator 14.

The amplifiers 298, 300 are preferably identical and the servo amplifier 302 is arranged to provide an output which is the amplifier difference between the outputs of the amplifiers 298, 300. Specifically, if the output of the amplifier 298 is greater than the output of the amplifier 300, the output of the servo amplifier 302 will operate the motor 294 to drive the plate 34' in the direction of the arrow 306 and, conversely, if the output of the amplifier 300 is greater than the output of the amplifier 298, the output of the servo amplifier will operate the motor 294 to drive the support plate in the direction of the arrow 308. The outputs of the amplifiers 298, 300 will be equal, i.e., each output is effective to cancel the other, when the indicator 14 is substantially centered between the devices 288, 290 to reflect light equally back thereon. If the indicator moves, even slightly, away from one device and toward the other device, the outputs of the amplifiers 298, 300 will vary and the servo amplifier 302 will operate the motor 294 to drive the plate 34' to a position which will keep the outputs of the amplifiers 298, 300 equal. I have illustrated an opening 310 in the plate 34' for receiving the light source for projecting light at the path of the indicator 14. Any one of the previously described light sources may be used with the devices 288, 290.

I have illustrated a manually-operated switch 312, 314 connected to the output of each amplifier 298, 300. These switches are provided so that the motor 294 can be driven manually in either direction to center the indicator 14 between the devices 288, 290. This will be required when the system 286 is deenergized and subsequently energized after the indicator has drifted from its position between the devices 288, 290.

The circuitry of the amplifiers 298, 300 and the servo amplifier 302 is well known and need not be discussed, in detail, herein. For a general description of such circuits, I again refer to the Transistor Manual published by the General Electric Company in 1964, and particularly to chapter 9 of that manual and the various references cited at the end of the chapter.

Likewise, the structure of the servo motor 294 is quite common and, therefore, need not be discussed, in detail, in this description.

The peripheral spacing between the devices 288, 290 is indicated, in FIG. 9, by the reference numeral 316. I presently believe that this angle 316 should be about 10°, i.e., small enough that, when the indicator 14 is substantially centered between the devices 288, 290, a distinguishable amount of light will be reflected toward both devices.

It will be apparent that the plate 34 will track, continuously, the indicator 14 in order to keep the devices 288, 290 resepectively on opposite sides of the indicator. Thus, in order to provide an output for particular increments of movement of the indicator 14, I have provided the pulse means, indicated generally by the reference numeral 316. The pulse means 316 comprises a pair of oppositely disposed ratchet wheels 318, 320 mounted on the shaft 292 for rotation therewith and a pawl 322, 324 operatively associated with each wheel. The pawl 322 is arranged momentarily to close a switch 326 each time the support plate 34' is driven through an increment of 36° in the direction of the arrow 306 and the pawl 324 is arranged momentarily to close a switch 328 each time the support plate 34' is driven through an increment of 36° in the direction of the arrow 308. That is, each ratchet wheel 318, 320 has formed thereon ten peripherally equally spaced teeth so that it will operate its pawl 322, 324 momentarily to close its associated switch 326, 328 ten times for each revolution in which it is driven in the direction which will operate its pawl. It will be apparent that, when the wheel 318 is driven in the direction of the arrow 308, the pawl 322 will not be operated to close the switch 326 and likewise when the wheel 320 is driven in the direction of the arrow 306, its pawl 324 will not be operated to close the switch 328.

In order to add the pulses generated when the support plate 34' is driven in the direction of the arrow 306 and to subtract the pulses generated when the support plate is driven in the direction of the arrow 308, a rotary stepping motor 330 is operatively connected to the switch 326 and a rotary stepping motor 332 is operatively connected to the switch 328. When the switch 326 is momentarily closed, the motor 330 will be momentarily energized by current flow from a power supply indicated at 334 and when the switch 328 is closed the motor 332 will be momentarily energized by current flow from a power supply indicated at 336. Each motor 330, 332 is drivingly connected as indicated at 338 to an encoder 90. As discussed in conjunction with other embodiments of my invention, when the encoder 90 is driven by the motor 330, it will add increments of altitude and, when the encoder is driven by the motor 332, it will subtract increments of altitude.

Figure 10:
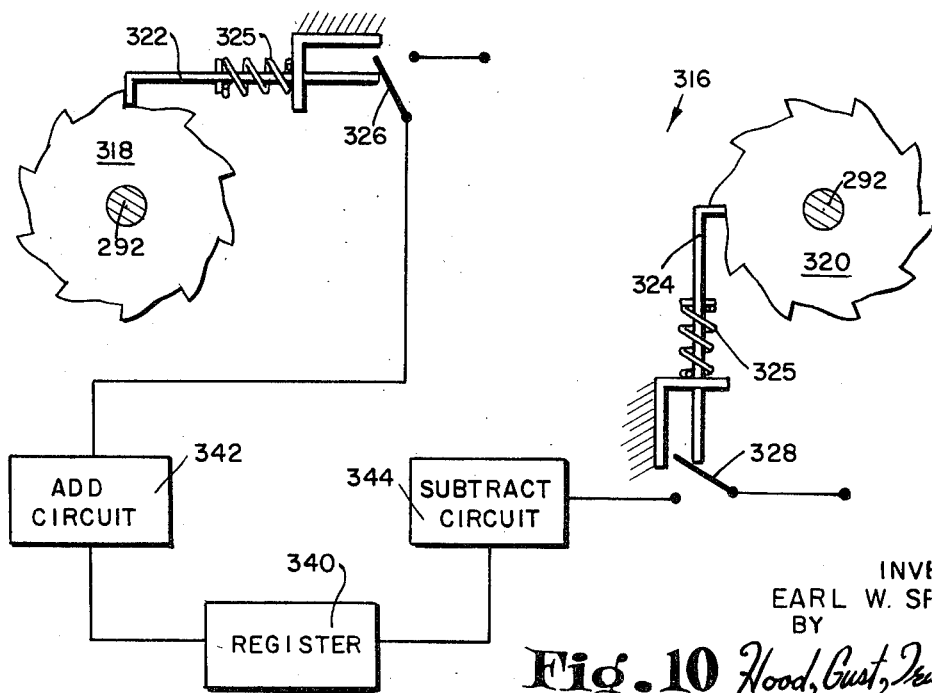
FIG. 10 is another block diagram showing the pulse means of FIG. 9 used in conjunction with an electronic register arranged to add and subtract the pulses representing movement of the support means.

Referring now to FIG. 10, another embodiment of my invention will be discussed. In FIG. 10, I show the pulse means 316 and a register 340 for adding and subtracting the pulses provided thereby. The register 340 may correspond to the register 266 discussed in conjunction with FIG. 8. I have connected the switch 326 through an add circuit 342 to the register 340 and the switch 328 through a subtract circuit 344 to the register. It will be noted that the ratchet wheels 318, 320 of the pulse means 316 provide the necessary direction sensing so that the register 340 can add all of the pulses provided by the switch 326 and subtract all of the pulses provided by the switch 328.

As stated previously, the register 340 may comprise a plurality of bistable multi-vibrators, each of which is arranged to operate a two-state switch corresponding to one bit of the pulse group series to be transmitted. The add circuit 342 and subtract circuit 344 may be rather conventional monostable multi-vibrators which are arranged to provide an output sufficient to drive a bistable multi-vibrator each time they receive an input.

Figure 11:
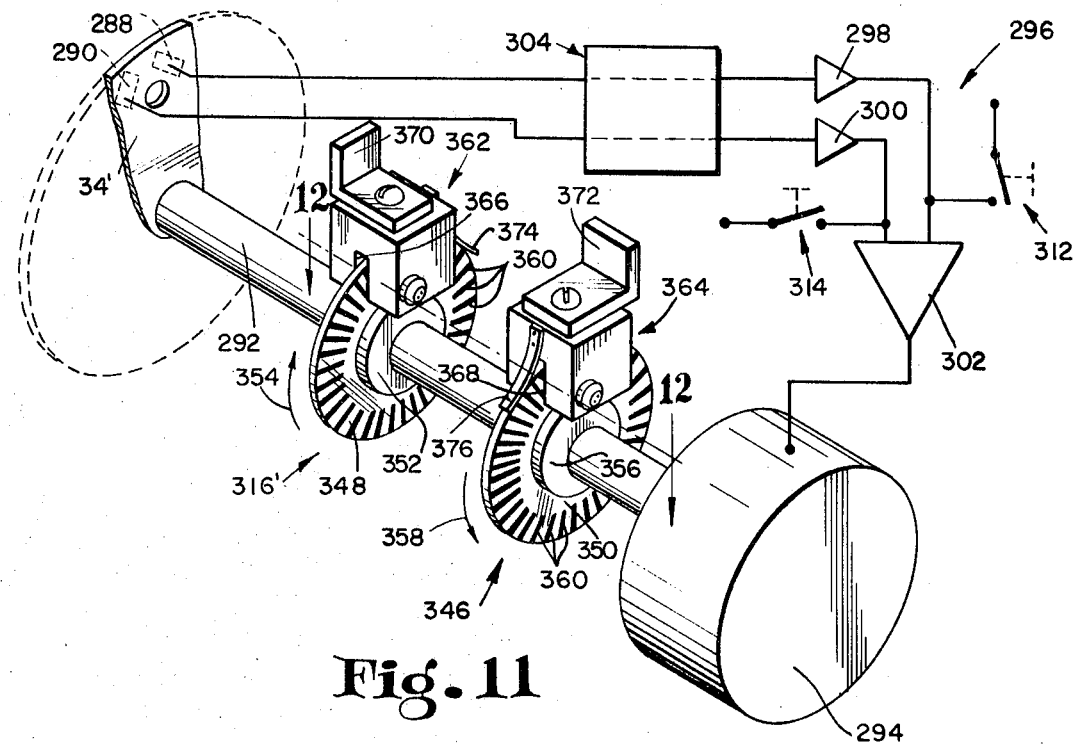
FIG. 11 is a block diagram of still another embodiment of my invention, this embodiment comprising a servo motor for driving the support means on which the light responsive devices are mounted and electro-optical means for producing pulses representing the movement of the support means.

Referring now to FIG. 11, another embodiment of my invention, indicated generally by the reference numeral 346, will be discussed. The system 346 is similar to the system 286 in that the support plate 34' is driven by a servo motor 294 which is controlled by the output of the devices 288, 290 mounted on the support plate. The system 346 utilizes an electro-optical pulse means, indicated generally by the reference numreal 316', for providing a pulse output when the plate 34' is driven by the motor 294. The pulse means 316' comprises a pair of glass discs 348, 350 mounted on the shaft 292. The disc 348 is connected to the shaft 292 by means of a one-way clutch 352 which is arranged so that the disc 348 can only be driven in the direction of the arrow 354. Similarly, the disc 350 is connected to the shaft 292 by means of a one-way clutch 356 which is arranged so that the disc 350 can only be driven in the direction of the arrow 358, i.e., in a direction opposite to the direction in which the disc 348 can be driven. Such one-way clutches are well known and commercially available and, therefore, do not need to be discussed, in detail, in this description.

Each of the glass discs 348, 350 is provided with a plurality of radially extending, peripherally spaced apart opaque segments 360. The purpose of these opaque segments will be explained hereinafter.

A stationary module 362, 364 is provided having a slot 366, 368 formed therein and receiving a peripheral portion of each disc 348, 350. Each module 362, 364 is supported by a bracket 370, 372. A leaf spring member 374, 376 is fastened to each module 362, 364 and arranged to engage the outer periphery of its associated disc 348, 350. The spring member 374 is arranged to prevent movement of the disc 348 in the direction of the arrow 358 and the spring member 376 is arranged to prevent movement in the disc 350 in the direction of the arrow 354.

Figure 12:
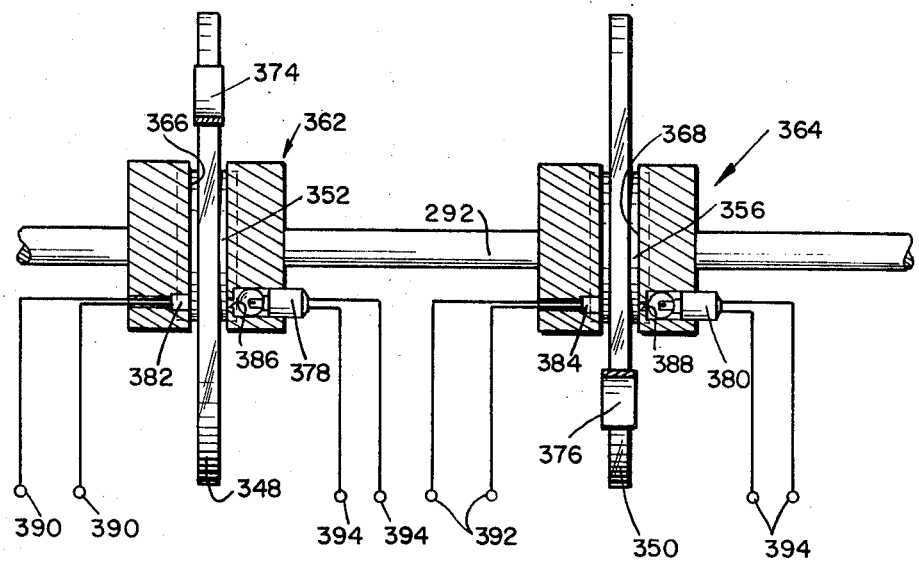
FIG. 12 is a fragmentary sectional view taken from FIG. 11 generally along the line 12—12 and showing the electro-optical means for producing pulses.

Referring now to FIG. 12, it will be seen that a light 378, 380 is disposed on one side of each slot 366, 368 and that a light-responsive device 382, 384 is disposed on the opposite side of each slot, each light being disposed to project light through a disc 348, 350 toward its opposing light-responsive device. Each module 362, 364 is provided with a small slit 386, 388 through which the light rays are projected toward its associated disc 348, 350. Each device 382, 384 is arranged electrically to change state when the amount of light impinging thereon changes. For instance, each device 382, 384 may provide a potential across its output terminals 390, 392 when light impinges thereon and a significantly smaller or no potential when there is no light impinging thereon. The devices 382, 384, therefore, may be referred to as light-actuated switches.

The module 362 is positioned so that, when the disc 348 rotates, the opaque segments 360 move between the light 378 and the device 382. Similarly, the module 364 is positioned so that, when the disc 350 rotates, its opaque segments 360 move between the light 380 and the device 384. Such movement of an opaque segment 60 between a light 378, 380 and its associated light-responsive device 382, 384 will cause the device electrically to change state. Specifically, as discussed above, each device 382, 384, may provide a potential across its output terminals 390, 392 when a transparent segment of its associated disc 348, 350 is adjacent thereto and a significantly smaller or no potential when an opaque segment of its associated disc is adjacent thereto.

I have illustrated, in FIG. 12, terminals 394 for connecting each light 378, 380 to a suitable power source.

The output of the pulse means 316' is, therefore, represented by the changing potential across the terminals 390, 392. It will be appreciated that any number of opaque segments 360 may be formed on each transparent glass disc 348, 350 to obtain any number of output pulses per revolution of the support plate 34'. For instance, the opaque segments 360 can be spaced apart by an angle as small as 5° so that the pulse means 316' will provide an output each time the indicator 14 moves 5°. This is one particular advantage of the system 346 illustrated in FIG.

11. On the other hand, it may be desirable only to have ten peripherally equally spaced opaque segments 360 on each disc 348, 350 so that the pulse means 316' will provide an output for each 36° increment of movement of the indicator 14.

Referring now to FIG. 13, it will be seen that I have illustrated a register 340 for adding pulses applied to the output terminals 390 and subtracting pulses applied to the output terminals 392. Specifically, the terminals 390 are connected to an add circuit 342, the output of which is applied to the register 340 and the terminals 392 are connected to a subtract circuit 344, the output of which is applied to the register. The register 340, add circuit 342 and subtract circuit 344 each correspond to their respectively numbered circuits in FIG. 10. Again, the one-way clutches 352, 356 provide the necessary direction sensing which permits the register 340 to add all the pulses applied across the terminals 390 and to subtract all the pulses applied across the terminals 392.

Referring now to FIG. 14, an encoder arrangement for adding and subtracting the pulses applied to the output terminals 390, 392 will be discussed. In FIG. 14, I have illustrated an encoder 90, the input shaft of which is driven in one direction by a rotary stepping motor 394 and in the opposite direction by another rotary stepping motor 396. The output terminals 390 are connected to an amplifier 398 which is arranged to render a silicon controlled switch 400 conductive when a potential is applied across the terminals 390. Likewise, the terminals 392 are connected to an amplifier 402 which is arranged to render a silicon controlled switch 404 conductive when a potential is applied across the terminals 392. The motor 394 will advance the encoder one step in one direction to add an increment of altitude when the switch 400 is rendered conductive and the motor 396 will move the encoder 90 one step in the opposite direction to subtract an increment of altitude when the switch 404 is rendered conductive.

Referring now to FIG. 15, another embodiment of my invention, indicated generally by the reference numeral 410, will be discussed. This embodiment 410 does require some modification of an altimeter in that it is necessary to remove the cover plate thereof and to install the light-responsive devices on the face of the altimeter to be behind the indicator 14. Also, it is necessary to provide some holes 412 in the housing of the altimeter so that connections can be made to the light-responsive devices. It will be appreciated that such modifications may be made by the manufacturer of the altimeter and that these modifications will, in no way, interfere with the normal operation of the altimeter. After the light-responsive devices are installed on the faces of the altimeter and connection is made thereto, the usual cover plate, i.e., glass cover 20 and face plate 24, shown in FIG. 3, can be installed.

The light-responsive devices utilized in the system 410 may be identical to those discussed previously. Thus, I have applied reference numerals to some of these devices to show that the devices correspond to the like numbered devices in FIGS. 7 and 8.

An amplifier 412 is connected to the clockwise device of each pair and a similar amplifier 414 is connected to the counterclockwise device of each pair, only three amplifiers 412 and only three amplifiers 414 being shown in FIG. 15. Each amplifier 412 is arranged to energize a switch means 416 having an output terminal 418, the switch means 416 corresponding to the switch means 252–256 in FIG. 8. Similarly, a switch means 420, which corresponds to the switch means 246–250 in FIG. 8, is connected to the output of each amplifier 414, each switch means 420 having an output terminal 422.

The system 410 comprises a light source means, indicated generally by the reference numeral 424, including a plurality of peripherally spaced apart light sources 426, each of which is arranged to direct light at one pair of light-responsive devices. The light sources 426 are carried by a plate 428 which is mounted adjacent the path of movement of the indicator 14.

Each of the light-responsive devices comprising the system 410 may be arranged to provide continually a potential to the amplifier 412, 414 connected thereto until the indicator 14 blocks the light projected at the device. In such a case, each switch means 416, 420 is arranged to provide a pulse output when the amplifier 412, 414 connected thereto is deenergized.

The indicator 14 is preferably arranged so that, when it is substantially centered between the two devices comprising each pair, it will block the light projected at both devices. Thus, the manner in which the indicator 14 energizes and deenergizes the light-responsive devices comprising the system 410 is analogous to that discussed in conjunction with FIGS. 7 and 8.

Referring now to FIG. 16, a system for registering the outputs applied to the terminals 418, 422 will be discussed. This system comprises the circuitry 260 of FIG. 8. Thus, each of the terminals 418 is arranged to provide pulses to the add circuit 264 and each of the terminals 422 is arranged to provide pulses to the substract circuit 262.

Referring now to FIG. 17, an encoder means for registering the position of the indicator 14 of the system 410 will be discussed. This system (FIG. 17) is directly analogous to the system shown in FIG. 7 and, therefore, only tthe distinguishing features of the two systems will now be discussed. In FIG. 17, the encoder 90 is shown drivingly connected to the shaft 78' by means indicated by the reference numeral 210.

A normally closed relay 194', 196', 198', 200' is operatively connected to each amplifier 414 and a normally closed relay 202', 204', 206', 208' is operatively connected to each amplifier 412, these relays corresponding directly to the like numbered relays in FIG. 7. Each of these relays 194'–208' is held open when the amplifier 412, 414 connected thereto is energized. The relay 234', which is operated by the relays 194', 196', 198', 200' is arranged normally to connect the rotary stepping motor 66" to the common contact member 232.

Referring now to FIGS. 18, 18a and 19, the preferred embodiment of the encoder 90 will be discussed. The encoder 90 comprises a first encoder disc 440 which is mounted on a shaft 442 for rotation therewith, the shaft 442 being connected directly to the shaft 86 discussed in conjunction with FIG. 2. Thus, in my preferred embodiment, the disc 440 is driven in steps of 36° by the rotary stepping motors discussed previously. In the embodiment of FIG. 2, the disc 440 will be driven directly with the support plate 34 on which the light-responsive devices 46, 48 are mounted. As discussed previously, one complete revolution of the support plate 34 and the disc 440 will represent an altitude change of 1,000 feet.

The encoder 90 further comprises an encoder disc 444 which is drivingly connected to the disc 440 by means of an intermittent motion transfer mechanism, indicated generally by the reference numeral 446, and a worm and worm gear means, indicated generally by the reference numeral 448. As illustrated in FIG. 18a, I have found that it is desirable to use a spring 445 yieldably to resist rotation of the disc 444 by the mechanism 446 and means 448. This spring, which is arranged to permit more than one revolution of the disc 444, eliminates backlash problems involved in the mechanism 446 and means 448. The input 450 of the mechanism 446 is connected to the shaft 442 for rotation with the disc 440. The output 452 of the mechanism 446 is mounted for rotation relative to the shaft 442 and the mechanism preferably includes means for providing a 5 to 1 step reduction between the input 450 and the output 452. The worm 454 of the worm and worm gear means 448 is connected to the output 452 for rotation relative to the shaft 442. The worm gear 456 is mounted on the shaft 458 on which the disc 440 is mounted. In one preferred embodiment of my encoder 90, the worm and worm gear means 448 provides a 10 to 1 reduction.

Since the disc 440 is driven in steps, the output 452 will be driven one step each time the disc 440 is driven through five steps in one direction. The mechanism 446, which preferably is a conventional transfer mechanism used in counters, will drive the worm 454 in precise steps to drive the disc 444 in precise steps. Since there is a 10 to 1 reduction provided by the worm and worm gear means 448, one step of the disc 444 will be 3.6° which equals an increment of altitude of 500 feet. Thus, a full revolution of the disc 444 represents 50,000 feet of altitude.

As will be discussed hereinafter, I prefer to drive a synchro transmitter with the shaft 458 on which the disc 444 is mounted, the transmitter in turn being connected to a synchro receiver which drives a pointer about a scale divided in 500 foot increments of altitude. Thus, a complete revolution of the pointer corresponds to a complete revolution of the disc 444. This pointer will then provide the pilot of an aircraft, at a glance, his altitude reading to the nearest 500 feet.

The aforementioned Report No. 8893–SP–1, which specifies the altitude telemetry code which my encoder must produce, calls for nine pulse bits designated as $A_1$, $A_2$, $A_4$, $B_1$, $B_2$, $B_4$, $D_2$, $D_4$ all for 500 foot altitude increments and $C_1$, $C_2$, $C_4$ all for 100 foot increments of altitude. Thus, my encoder disc 440 provides three concentrically arcuate contact strips 460, 462, 464 (FIG. 19). In FIG. 19, I show a contact member $C_1$, $C_2$, $C_4$ arranged to engage each contact strip 460, 462, 464. Similarly, in FIG. 18, I have illustrated contact members corresponding to each of the pulse outputs $A_1$, $A_2$, $A_4$, $B_1$, $B_2$, $B_4$, $D_2$, $D_4$. While I have illustrated a contact member corresponding to each of the required pulse outputs, it will be understood that I have made no attempt, in FIGS. 18 and 19, to place these contact members in their proper positions relative to the disc 440, 444 with which they are associated. Further, it is within the capability of those skilled in the encoder arts to arrange contact members and contact strips so as to produce desired encoder outputs for given positions of the disc. For this particular application, the code output for any given 100 foot increment of altitude is defined in the ICAO agreements.

My encoder 90 is supported on a frame including the horizontally extending member 466 and the upright members 468, 470 through which the shaft 442 extends.

One advantage of my encoder 90 is that each of the discs 440, 444 is driven in finite steps by rotary stepping motors. Since, as discussed previously, these rotary stepping motor can provide a relatively high torque output, I can urge the contact members against their respective discs 440, 444 with sufficient force to assure good contact between each contact member and its respective contact strip. Further, this manner of driving the encoder permits me to drive a synchro transmitter or the like with the output shaft 458 of the encoder.

In FIGS. 18 and 19, I have not illustrated the common ground contact member associated with each disc 440, 444.

The shaft 86 is preferably connected to the shaft 442 by a misalignment coupling 472 and the shaft 442 is preferably connected to the shaft 30 by another misalignment coupling 474.

It will be appreciated that all of the contact members $A_1$, $A_2$, $A_4$, $B_1$, $B_2$, $B_4$, $C_1$, $C_2$, $C_4$, $D_2$, $D_4$ may be arranged to engage contact strips formed on a single disc. In such a case, the disc must necessarily be driven in smaller steps in order to provide a range of altitude readings running from a —1,000 feet to 50,000 feet. Such an encoder will be much more difficult to manufacture than my encoder 90 comprising the two discs 440, 444 and the transfer mechanism 446 and worm and worm gear means 448 drivingly connecting the two discs.

Referring now to FIG. 20, another embodiment of my invention, indicated generally by the reference numeral 500, will be discussed. For this discussion, reference is made to the block diagram of FIG. 5 and the description of the system illustrated therein.

The system 500 comprises a synchro system 502 for driving a numerical counter device 92' which displays 100 foot increments of altitude and a synchro system 504 for driving a pointer 506 which indicates 500 foot increments of altitude.

The synchro system 502 includes a synchro transmitter 508 and a synchro receiver 510, the field coils of the transmitter and receiver being connected in a conventional fashion. Also, conventionally, a primary coil 512 is associated with the transmitter 508 and a primary coil 514 is associated with the receiver 510, the coils 512, 514 being connected in parallel.

The synchro system 504 comprises a synchro transmitter 516 and a synchro receiver 518, the field coils of the transmitter and receiver being connected in a conventional manner. A primary coil 520 is associated with the transmitter 516 and a primary coil 522 is associated with the receiver 518, these primary coils also being connected in parallel. One side of each of the primary coils 512, 514 520, 522 is connected to ground. The other side of each primary coil 512, 514, 520, 522 is connected to a movable contact member 534 of the double pole, double throw relay 142' associated with the motor 64' and also to a movable contact member 534 of the double pole, double throw relay 142' associated with the motor 66'. It will be noted that the relays 142 illustrated in FIG. 5 are single pole, single throw relays.

One stationary contact member 528, 530 of each relay 142' is connected to the 110 volt tap of the secondary winding 524 of an isolation transformer 526 and another stationary contact member 528', 530' of each relay is connected to a 25 volt tap of the secondary winding. Normally, the contact members 534 are, respectively, in contact with the contact members 528', 530' and, therefore, there is normally a 25 volt potential on the coils 512, 514, 520, 522. When either relay 142' is energized, its contact member 534 is moved momentarily to contact the stationary contact member 528, 530 to apply a 110 volt potential to the coils 512, 514, 520, 522. It will be appreciated that the surge of current developed by the 110 volt potential will be sufficient rapidly to drive each receiver 510, 518 to follow its respective transmitter 508, 516.

Each relay 142' also comprises a movable contact member 532 which is operated, when the relay is energized, to deenergize the motor 64', 66' associated therewith.

The system 500 is arranged, therefore, so that, when the support plate 34 is driven by one of the motors 64', 66', a surge of current developed by the 110 volt potential is delivered to each primary coil 512, 514, 520, 522. The rotor of the synchro transmitter 508 is drivingly connected to the motor 64', 66' by means indicated at 536. The rotor of the synchro transmitter 516 is drivingly connected to the encoder 90 by means indicated at 538. As discussed previously in conjunction with FIG. 18, the synchro transmitter 516 is preferably drivingly connected to the shaft 458 on which the disc 440 is mounted. Thus, the rotor of the transmitter 508 is driven in increments of 36° each time the support plate 34 is driven and the rotor of the transmitter 516 is driven in increments of 3.6° each time the disc 444 of the encoder 90 is driven. The receiver 510 follows the transmitter 508 and drives the counter 92' to display numerically, to the nearest 100 feet, the position of the indicator of the altimeter.

The pointer 506, which is driven by the receiver 518, is associated with an altitude scale indicated at 540. This scale 540, pointer 506 and receiver 518 preferably will be mounted in the instrument panel of an aircraft so that the pilot of the aircraft can observe the position of the pointer.

It will be noted that I have not shown amplifiers which are normally associated with synchro transmitters and receivers. I have eliminated such amplifiers by energizing the primary coils 512, 514, 520, 522 with surges of current created by momentarily connecting the movable contact members 534 to the 110 volt tap of the secondary winding 524. It will be understood that these surges of current are not applied steadily to the primary coils 512, 514, 520, 522 and, therefore, no heat problems will develop in the synchro systems 502, 504. These surges of current are sufficient, however, to cause each synchro receiver 510, 518 rapidly to follow its respective synchro transmitter 508, 516. The steady state current developed by the 25 volt potential will develop no heat problems.

Referring now to FIG. 21, it will be seen that I have illustrated a contact 534 which can be momentarily closed by a cam 76' driven by one of the rotary stepping motors 64, 66. Reference is made to FIG. 4 which shows the rest of the circuitry associated with each motor 64, 66.

The cam 76' and its associated contact member 534 are provided in lieu of one of the double pole, double throw relays 142' of FIG. 20. The cam 76' is arranged momentarily to contact the contact member 534 to its associated contact member 528, 530 after its associated motor 64, 66 has been driven through one of its steps, thereby pulsing the primary coils 512, 514, 520, 522 of synchro systems corresponding to synchro systems 502, 504.

Referring now to FIG. 22, a checking circuit, indicated generally by the reference numeral 570, will be described. This circuit 570 is preferably used with the snychro systems 502, 504 discussed in conjunction with FIGS. 20 and 21. The circuit 570 comprises a pair of relays 572, 574, each of which is arranged, when it is energized, to connect a terminal 576, 578 through a resistor 580 to a positive voltage source. When the positive voltage source is a 28 volt source, I prefer that the resistor 580 be a 12 megohm resistor. I also prefer to connect a capacitor 582 between the resistor and ground as illustrated in FIG. 22, this capacitor being a .01 microfarad capacitor.

I have provided a momentary contact switch 584, 586, of conventional type, connected to each relay 572, 574 and arranged so that, when the switch is actuated, the relay will be energized. For convenience, I have also provided a selector knob 588 for selectively operating the switches 584, 586. The switches 584, 586 and the relays 572, 574 are normally open. Thus, there will be no potential applied to the terminals 576, 578 until the knob 588 is actuated to actuate one of the switchs 584, 586.

I prefer to use the circuit 570 in conjunction with the amplifiers 56, 58, the amplifier 56 being shown in detail in FIG. 4. Specifically, I prefer to connect the terminal 578 to a control gate of the silicon controlled switch 60 and the terminal 576 to the control gate of the silicon controlled switch 62. When such connections are made, the silicon controlled switch 60 will be rendered conductive when the relay 574 is operated and the silicon controlled switch 62 will be rendered conductive when the relay 572 is operated. That is, when the relay 572, 574 is operated, current which is sufficient to render a silicon controlled switch 60, 62 conductive can flow from the positive voltage source through the resistor 580 and the relay to the terminal 576, 578.

The circuit 570 is, therefore, another means for driving the support plate 34 and the encoder 90 until the outputs of the synchro systems 502 and 504 and, consequently, the output of the encoder 90, produce a reading which corresponds to the reading of the primary altimeter on the instrument panel of the aircraft. Thus, I find it desirable to put the selector knob 588 and the switches 584, 586 in a convenient location on the instrument panel. Preferably, the knob 588 and switches 584, 586 will be located adjacent the counter 92' and pointer 506 (FIG. 20).

I call the circuit 570 a checking circuit because it can be used by a pilot to determine whether the light-responsive devices 46, 48 are respectively on opposite sides of the indicator 14. Specifically, if the light-responsive devices 46, 48 are respectively on opposite sides of the indicator 14, closing of either of the switches 584, 586 will not operate the rotary stepping motors 64, 66 to drive the counter 92 or the pointer 506. This is true because, if the indicator 14 is between the devices 46, 48 and the support plate 34 is moved by operation of the switches 584, 586, the movement of one of the devices 46, 48 past the indicator 14 will operate its respective amplifier 56, 58 to cause the support plate to be driven in the opposite direction. Thus, the pilot will observe that he is unable to change the output of the numerical counter 92 by operating the knob 588 and then realizes that the devices 46, 48 are respectively on opposite sides of the indicator 14. If, for some reason such as power failure, the devices 46, 48 are not respectively on opposite sides of the indicator 14, sequentially closing one of the switches 584, 586 will drive the support plate 34 until the devices 46, 48 are again respectively on opposite sides of the indicator 14.

Of course, the pilot will recognize a power failure or some other such occurrence when the counter 92 and pointer 506 includes an altitude which is different from that indicated by his primary altimeter. In order to permit driving of the support plate 34 more than one revolution after a power failure and the primary altimeter indicates an altitude which is more than 1,000 feet greater than or less than the altitude indicated by the pointer 506 and counter 92, I will provide a switch (not shown) which will be positioned close to the actuator knob 588, which switch is arranged to disconnect both of the amplifiers 56, 58 from the 28 volt power source to which they are connected. Thus, when the amplifiers 56, 58 are disconnected from the 28 volt source, the support plate 34 can be driven by actuation of the switches 584, 586 until the reading of the counter 92 and pointer 506 correspond to the reading of the primary altimeter.

The question of static bearing friction in an altimeter has long bothered pilots. Often, a pilot will tap an altimeter lightly to assure himself that the altitude reading is not, in any way, affected by static bearing friction in the altimeter. One advantage of my system which uses rotary stepping motors 64, 66 is that the motors produce enough mechanical vibration when they are energized to overcome any static bearing friction in the altimeter 12.

What is claimed is:

1. An altitude reporting system comprising an altitude sensing element and an indicator connected to said element and mounted for rotational movement about an axis, means for tracking the position of said indicator, said tracking means including support means journalled for rotation about said axis and adjacent said indicator and electro-optical means for detecting movement of said indicator, said electro-optical means including light-responsive means mounted on said support means for rotation therewith, said light-responsive means being arranged electrically to change state when said indicator moves relative thereto, first means including a register for registering the position of said indicator and providing an electrical pulse output representing a binary-coded pulse group series corresponding to the altitude indicated by the position of the indicator, and second means for operatively connecting said first means to said electro-optical means, said second means being effective, when said indicator moves in one direction about its axis, to operate said register to add increments of such movement and, when said indicator moves in the opposite direction about its axis, to operate said register to subtract like increments of movement, said second means including drive means for driving said support means about its axis, said drive means being connected to said light-responsive means and responsive to such an electrical change in state thereof to keep said support means in a position such that said light-responsive means is adjacent said indicator.

2. The system of claim 1 in which said register includes an encoder comprising a disc carrying a plurality of concentrically arcuate contact strips and a plurality of contact members, each contact member engaging one of said contact strips, and means connected to said drive means and arranged to provide relative rotation between said contact members and said contact strips when said drive means is energized.

3. The apparatus of claim 1 in which said second means includes first pulse means operatively connected to said drive means and arranged to provide an electrical pulse each time said support means is driven a predetermined amount in one direction about said axis and second pulse means operatively connected to said drive means and arranged to provide an electrical pulse each time said support means is driven a similar amount in the opposite direction about said axis, and said register comprises means for adding pulses provided by said first pulse means and subtracting pulses provided by said second pulse means.

4. The apparatus of claim 3 in which each of said pulse means includes a ratchet wheel drivingly connected to said drive means, pawl means operated by rotation of said ratchet wheel in one direction and switch means operated by said pawl means.

5. The apparatus of claim 3 in which each of said pulse means includes a transparent glass disc having a plurality of non-transparent segments equally spaced about the periphery thereof, a light source on one side of said disc and a light-actuated electronic switching means on the opposite side of said disc, said light source and switching means being arranged so that the light impinging on said switching means is blocked by the movement of said non-transparent segments therebetween, and one-way clutch means drivingly connecting said disc to said drive means.

6. The apparatus of claim 1 in which said second means includes first pulse means operatively connected to said drive means and arranged to provide an electrical pulse each time said support means is driven a predetermined amount in one direction about said axis and second pulse means operatively connected to said drive means and arranged to provide an electrical pulse each time said support means is driven a similar amount in the opposite direction about said axis, and a rotary stepping motor operatively connected to each of said pulse means to be energized by the pulse output thereof, and said register includes an encoder comprising at least one disc providing a plurality of concentrically arranged arcuate contact strips, and a stationary contact member engaging each of said contact strips, one of said rotary stepping motors being arranged to drive said disc in one direction and the other of said rotary stepping motors being arranged to drive said disc in the opposite direction.

7. The apparatus of claim 6 in which each of said pulse means includes a ratchet wheel drivingly connected to said drive means, pawl means operated by rotation of said ratchet wheel in one direction and switch means operated by said pawl means.

8. The apparatus of claim 6 in which each of said pulse means includes a transparent glass disc having a plurality of non-transparent segments equally spaced about the periphery thereof, a light source on one side of said disc and a light-actuated electronic switching means on the opposite side of said disc, said light source and switching means being arranged so that the light impinging on said switching means is blocked by the movement of said non-transparent segments therebetween, and one-way clutch means drivingly connecting said disc to said drive means.

9. An apparatus of the character described comprising sensing means including a movable indicator, means for tracking the position of said indicator, said tracking means including electro-optical means for detecting movement of said indicator, first means including a register for registering the position of said indicator and providing an output corresponding to such a position, and second means for operatively connecting said first means to said electro-optical means, said second means being effective, when said indicator moves in one direction along its path of movement, to operate said register to add increments of such movement and, when said indicator moves in the opposite direction along its path, to operate said register to subtract like increments of movement, said electro-optical means including a pair of light-responsive devices, support means movable along and adjacent the path of movement of said indicator, said devices being mounted on said support means for movement therewith, and light source means carried on said support means and ararnged to direct light away from said devices and toward the path of movement of said indicator, said indicator being proportioned and designed to reflect such light back toward each of said devices, and each of said devices being effective, when said indicator moves adjacent thereto and produces a change in the amount of light impinging thereon, electrically to change state, and said second means including drive means responsive to such a change in state of said devices and drivingly connected to said support means, said drive means being arranged, when one of said devices changes state, to drive said support means in one direction along the path of movement of said indicator and, when the other of said devices changes state, to drive said support means in the opposite direction along the path of movement, said devices being spaced apart on said support means so that, when said indicator is substantially centered therebetween, said drive means is deenergized and, when said indicator moves adjacent one of said devices, said drive means is energized to drive said support means until said indicator is again substantially centered between said devices, and said register including an encoder comprising movable contact strips and stationary contact members engaging said strips, said movable contact strips being drivingly connected to said drive means.

10. An apparatus of the character rescribed comprising sensing means including a movable indicator, means for tracking the position of said indicator, said tracking means including electro-optical means for detecting movement of said indicator, first means including a register for registering the position of said indicator and providing an output corresponding to such a position, and second means for operatively connecting said first means to said electro-optical means, said second means being effective when said indicator moves in one direction along its path of movement, to operate said register to add increments of such movement and, when said indicator moves in the opposite direction along its path, to operate said register to subtract like increments of movement, said indicator being mounted for movement about an axis, said electro-optical means including a pair of light-responsive devices, support means journalled for rotation about said axis and adjacent said indicator, said devices being mounted on said said support means for movement therewith, and light source means carried by said support means and arranged to direct light toward the path of movement of said indicator, said indicator being proportioned and designed to reflect such light toward said devices, and each of said devices being effective, when said indicator moves adjacent thereto and produces a change in the amount of light impinging thereon, electrically to change state, and said second means including drive means responsive to such a change in state of said devices and drivingly connected to said support means, said drive means being arranged, when one of said devices changes state, to drive said suport means in one direction about said axis and, when the other of said devices changes state, to drive said support means in the opposite direction about said axis, said devices being peripherally spaced apart on said support means so that, when said indicator is substantially centered therebetween, said drive means is deenergized and, when said indicator moves adjacent one of said devices, said drive means is energized to drive said support means until said indicator is again substantially centered between said devices, and said register including an encoder comprising at least one journal mounted disc carrying a plurality of concentrically arcuate contact strips, said disc being drivingly connected to said drive means for rotational movement corresponding to the rotational movement of said support means, and a stationary contact member engaging each of said contact strips.

11. The apparatus of claim 10 in which said drive means includes a first rotary stepping motor arranged to drive said support means and said disc in one direction and a second rotary stepping motor arranged to drive said support means and said disc in the opposite direction.

12. The apparatus of claim 11 in which each of said rotary stepping motors is arranged, each time it is energized, to drive said support means an amount equal to one-half of the peripheral spacing between said devices.

13. An apparatus of the character described comprising sensing means including a movable indicator, means for tracking the position of said indicator, said tracking means including electro-optical means for detecting movement of said indicator, first means including a register for registering the position of said indicator and providing an output corresponding to such a position, and second means for operatively connecting said first means to said electro-optical means, said second means being effective, when said indicator moves in one direction along its path of movement, to operate said register to add increments of such movement and, when said indicator moves in the opposite direction along its path, to operate said register to subtract like increments of movement, said indicator being mounted for movement about an axis, said electro-optical means including a pair of light-responsive devices, support means journalled for rotation about said axis and adjacent said indicator, said devices being mounted on said support means for movement therewith, and light source means carried by said support means and arranged to direct light toward the path of movement of said indicator, said indicator being proportioned and designed to reflect such light toward said devices, and each of said devices being effective, when said indicator moves adjacent thereto and produces a change in the amount of light impinging thereon, electrically to change state, and said second means including drive means responsive to such a change in state of said devices and drivingly connected to said support means, said drive means being arranged, when one of said devices changes state, to drive said support means in one direction about said axis and, when the other of said devices changes state, to drive said support means in the opposite direction about said axis, said devices being peripherally spaced apart on said support means so that, when said indicator is substantially centered therebetween, said drive means is deenergized and, when said indicator moves adjacent one of said devices, said drive means is energized to drive said support means until said indicator is again substantially centered between said devices, and said register including an encoder comprising a disc carrying a plurality of concentrically arcuate contact strips and a plurality of contact members, each contact member engaging one of said contact strips, and means connected to said drive means and arraged to provide relative rotation between said contact strips and said contact members when said drive means is energized.

14. An altitude indicating and reporting system comprising a conventional aircraft altimeter having an indicator mouted for rotational movement about an axis, support means journalled for rotation about said axis and adjacent said indicator, a pair of light-responsive devices mounted on said support means for rotation therewith, light source means arranged to direct light toward said indicator, each of said devices having its light-responsive surface facing the path of movement of said indicator, each of said devices being effective, when said indicator moves adjacent thereto and reflects such light theretoward, electrically to change state to indicate such movement of said indicator, a first rotary stepping motor arranged to drive said support means in one direction about said axis, a secondary rotary stepping motor arranged to drive said support means in the opposite direction about said axis, first circuit means for operatively connecting one of said devices to said first stepping motor and second circuit means for operatively connecting the other of said devices to said second stepping motor, each of said stepping motors being responsive to such an electrical change of state in the device connected thereto to drive said support means a predetermined amount about said axis, said devices being peripherally spaced apart by an amount approximately equal to twice said predetermined amount, whereby, when said indicator is between said devices and moves toward one of said devices, said support means is driven said predetermined amount to maintain said indicator between said devices, and encoder means including input shaft means, said shaft means being drivingly connected to said first and second stepping motors for movement corresponding to the movement of said support means.

15. The system of claim 14 in which each of said first and second circuit means comprises an electronic switch means having a control electrode and an anode and cathode circuit connected in series with the motor connected thereto, and an amplifier circuit connected between said control electrode and the devices associated with the motor, said amplifier circuit being responsive to such an electrical change in state of said device to render said switch means conductive, thereby to energize said motor.

16. The system of claim 15 in which each of said first and second circuit means includes switch means for de-energizing the motor connected thereto and switch-operating means driven by the motor.

17. The system of claim 15 in which each of said first and second circuit means includes a relay for deenergizing the motor connected thereto, a resistor-capacitor network connected across the motor and defining a predetermined time constant, the coil of said relay being connected across said network so that said relay is operated, after a time period determined by said time constant, to deenergize the motor.

18. The system of claim 15 in which said operating means includes a double pole, double throw relay associated with each motor, a resistor-capacitor network connected to the power circuit for said motor and to the coil of said relay, said network being arranged to energize said relay a predetermined time after said motor is energized, one pole of said relay being operative to deenergize said motor and the other pole of said relay being operative to energize the primary coils of said transmitter and receiver.

19. The system of claim 15 in which each of said first and second circuit means includes manually-operated switch means connected to said control electrodes, said switch means being arranged momentarily to contact said control electrode to a power source sufficient to render said electronic switch means conductive, thereby to energize the motor connected thereto.

20. The system of claim 14 including a numerical display adapted to be mounted on the instrument panel of an aircraft, and means providing a driving connection between said first and second stepping motors and said display.

21. The system of claim 20 in which said means providing a driving connection includes a synchro transmitter drivingly connected to said first and second stepping motors, a synchro receiver drivingly connected to said display, and means providing a circuit connection between said transmitter and receiver.

22. The system of claim 21 in which said last-mentioned means providing a circuit connection includes switch means arranged momentarily to connect said transmitter and receiver to a voltage source sufficient rapidly to drive said receiver to follow said transmitter, and means driven by said motors and arranged to operate said switch means.

23. The system of claim 14 in which said encoder comprises a first disc connected to said shaft means for rotation therewith, a plurality of concentrically arcuate first contact strips carried by said first disc and a stationary contact member engaging each of said first contact strips, a second disc, a plurality of concentrically arcuate second contact strips carried by said second disc and a stationary contact member engaging each of said second contact strips, and reducing means including an intermittent motion transfer mechanism providing a driving connection between said first and second discs.

24. The system of claim 23 in which said reducing means further includes a worm and mating worm gear, said worm being driven by the output of said transfer mechanism and said worm gear being connected to said second disc.

25. The system of claim 23 including a synchro transmitter drivingly connected to said second encoder disc, a synchro receiver, a stationary altitude scale, a pointer carried by the output shaft of said synchro receiver and arranged to move about said scale, said receiver, pointer and scale being adapted to be mounted on the instrument panel of an aircraft, and circuit means providing a connection between said transmitter and receiver so that said pointer will follow said second encoder disc.

26. The system of claim 25 in which said last-mentioned means providing a circuit connection includes switch means arranged momentarily to connect the primary coils of said transmitter and receiver to a voltage source sufficient rapidly to drive said receiver to follow said transmitter, and means for operating said switch means, said operating means being associated with each motor and arranged to operate said switch means after said motor has been energized to drive said support means.

27. The system of claim 14 in which said light source means includes a light projector associated with each of said devices, each projector comprising a radially extending light rod carried by said support means, a housing carried by said support means, said housing being formed to provide a slit extending longitudinally along said rod and opening toward the path of movement of said indicator, a lamp disposed in said housing and on the side of said rod which is generally opposite to said slit, whereby light is projected transversely through said rod and said slit toward said path of movement.

28. The system of claim 27 in which the housing for each projector is formed to provide a tubular portion in which the lamp is disposed, said tubular portion being disposed at an acute angle relative to the plane defined by the path of movement of said indicator, the axes of said tubular portions intersecting at a point behind said plane, said projectors being disposed in front of said plane.

29. The system of claim 28 in which said acute angles are approximately 60°.

30. The system of claim 28 in which said devices are disposed between said projectors, said devices and said projectors being spaced apart such that said indicator is movable through an arc of approximately 72° between a point at which one of said devices changes state to a point at which the other of said devices changes state.

31. The system of claim 30 in which said acute angles are approximately 60°.

32. The system of claim 14 in which said light source means includes a light projector associated with each of said devices, each projector comprising a cylindrical light rod carried by said support means, the axis of said rod extending radially outwardly from said first-mentioned axis and generally parallel to the plane defined by the path of movement of said indicator and a lamp arranged to project light transversely through said rod toward said path of movement.

33. The system of claim 14 including a sleeve peripherally engaging said rod, said sleeve having a longitudinally extending slit formed therein and opening toward said path of movement, a tube connected to said sleeve at a point intermediate its ends to be in communication therewith, said tube extending outwardly from said sleeve at the side thereof which is generally opposite to said slit, said lamp being disposed in said tube.

34. The system of claim 23 including spring means yieldably resisting rotation of said second disc by said reducing means.

References Cited

UNITED STATES PATENTS

| | | | |
|---|---|---|---|
| 2,046,005 | 6/1936 | Sprecker | 177—13 |
| 2,351,081 | 6/1944 | Swift | 346—33 |
| 2,430,780 | 11/1947 | Peterson | 346—31 |
| 3,304,553 | 2/1967 | Phillips | 346—31 |
| 2,142,602 | 1/1939 | Blethen | 250—231 |
| 2,265,149 | 12/1941 | Crane et al. | 250—231 |
| 3,397,319 | 8/1968 | Locke | 250—231 |
| 3,423,597 | 1/1969 | Delp | 250—231 |

DONALD O. WOODIEL, Primary Examiner

U.S. Cl. X.R.

250—231

PO-1050
(5/69)

UNITED STATES PATENT OFFICE
CERTIFICATE OF CORRECTION

Patent No. 3,513,708        Dated May 26, 1970

Inventor(s)    Earl W. Springer

It is certified that error appears in the above-identified patent and that said Letters Patent are hereby corrected as shown below:

Column 2, line 63, "by" (first occurrence) should be -- be --. Column 3, line 9, "creases" should be -- crease --. Column 4, line 72, "fact-however," should be -- fact, however, --. Column 7, line 26, "change" should be -- changes --; same column, line 47, "silica" should be -- silicon --. Column 8, line 12, "in" should be -- is --. Column 11, line 15, "to" should be elided. Column 13, line 12, "contact strip 16" should be -- contact strip 216 --; same column, line 36, " 64",64" " should be -- 64",66" --. Column 14, line 47, "mattery" should be -- matter --. Column 15, line 9, "circuits" is misspelled; same column, line 41, -- both -- should be inserted after "from" and before "circuits". Column 16, line 35, "amplifier" should be -- amplified --. Column 17, line 10, "respectively" is misspelled. Column 18, line 6, "numeral" is misspelled; same column, line 55, "60" should be -- 360 --. Column 20, line 26, "the" (first occurrence) is misspelled. Column 21, line 36, "disc" should be -- discs --; same column, line 49, "motor" should be -- motors --. Column 24, line 13, "realizes" should be -- realize --; same column, line 22, "includes" should be -- indicate --. Column 26, line 13, "arranged" is misspelled; same column, line 56, "said said" should be -- said --; same column, line 68, "support" is misspelled. Column 27, line 63, "arranged" is misspelled. Column 28, line 5, "secondary" should be -- second --

SIGNED AND
SEALED
SEP 22 1970

SEPT. 22, 1970

(SEAL)
Attest:

Edward M. Fletcher, Jr.
Attesting Officer

WILLIAM E. SCHUYLER, JR.
Commissioner of Patents